US010602069B2

(12) United States Patent
Misawa et al.

(10) Patent No.: US 10,602,069 B2
(45) Date of Patent: Mar. 24, 2020

(54) DIGITAL CAMERA AND DISPLAY METHOD OF DIGITAL CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 20 days.

(21) Appl. No.: 16/138,423

(22) Filed: Sep. 21, 2018

(65) Prior Publication Data

US 2019/0028654 A1 Jan. 24, 2019

Related U.S. Application Data

(63) Continuation of application No. PCT/JP2017/010385, filed on Mar. 15, 2017.

(30) Foreign Application Priority Data

Mar. 31, 2016 (JP) ................................ 2016-071663

(51) Int. Cl.
*H04N 5/232* (2006.01)
*G03B 17/04* (2006.01)
(Continued)

(52) U.S. Cl.
CPC ....... *H04N 5/232939* (2018.08); *G03B 17/04* (2013.01); *G03B 17/18* (2013.01);
(Continued)

(58) Field of Classification Search
CPC ....... H04N 5/232939; H04N 5/225251; H04N 5/225; H04N 5/232; G03B 17/04; G03B 17/18
(Continued)

(56) References Cited

U.S. PATENT DOCUMENTS 6,075,951 A 6/2000 Maruyama
7,526,195 B2 * 4/2009 Oh ........................ G03B 13/02 348/333.06
(Continued)

FOREIGN PATENT DOCUMENTS

CN 101742101 A 6/2010
CN 103731602 A 4/2014
(Continued)

OTHER PUBLICATIONS

Chinese Office Action and Search Report dated Feb. 26, 2019, for counterpart Chinese Patent Application No. 201780020408.7, with English translation.
(Continued)

*Primary Examiner* — Pritham D Prabhakher
(74) *Attorney, Agent, or Firm* — Birch, Stewart, Kolasch & Birch, LLP

(57) ABSTRACT

A first display unit is a variable-angle liquid crystal display device, and is a transmissive type color liquid crystal display device that mainly displays a live view image. A second display unit is a reflective type monochrome liquid crystal display device that mainly displays camera information items. In a case where it is difficult to view a display screen since intensity of light radiated to the display screen of the first display unit is high and both the display screens of the first display unit and the second display unit are simultaneously visible by adjusting an angle of the display screen of the first display unit, information to be displayed on the second display unit is switched to information (a live view image of a binary image) for supporting framing from the camera information items.

19 Claims, 10 Drawing Sheets

(51) Int. Cl.
*G03B 17/18* (2006.01)
*H04N 5/225* (2006.01)

(52) U.S. Cl.
CPC ....... *H04N 5/225* (2013.01); *H04N 5/225251* (2018.08); *H04N 5/232* (2013.01)

(58) Field of Classification Search
USPC ..................................................... 348/333.01
See application file for complete search history.

(56) References Cited

U.S. PATENT DOCUMENTS

| | | | | |
|---|---|---|---|---|
| 8,284,304 | B2 * | 10/2012 | Yoshida | H04N 5/2251 348/373 |
| 8,400,547 | B2 * | 3/2013 | Akita | H04N 5/23293 348/222.1 |
| 8,654,238 | B2 * | 2/2014 | Fujinawa | H04N 1/00442 348/333.01 |
| 8,725,213 | B2 * | 5/2014 | Nakamura | H01Q 1/243 455/550.1 |
| 9,317,198 | B2 * | 4/2016 | Kwak | G06F 3/017 |
| 9,335,887 | B2 * | 5/2016 | Kwak | G06F 3/0482 |
| 9,525,139 | B2 * | 12/2016 | Kitamura | H01L 51/006 |
| 9,571,734 | B2 * | 2/2017 | Kwak | G06T 3/40 |
| 10,255,481 | B2 * | 4/2019 | Cho | H04N 5/23293 |
| 2006/0210263 | A1 * | 9/2006 | Oh | G03B 13/02 396/287 |
| 2008/0165269 | A1 * | 7/2008 | Kim | G06F 1/1622 348/333.12 |
| 2009/0115880 | A1 * | 5/2009 | Wada | G03B 17/18 348/333.01 |
| 2010/0110215 | A1 | 5/2010 | Akita et al. | |
| 2010/0182265 | A1 * | 7/2010 | Kim | G06F 1/1616 345/173 |
| 2011/0102314 | A1 * | 5/2011 | Roux | G06F 15/02 345/156 |
| 2012/0196651 | A1 * | 8/2012 | Nakamura | H01Q 1/243 455/556.1 |
| 2012/0218202 | A1 * | 8/2012 | Sirpal | G06F 1/1616 345/173 |
| 2012/0242599 | A1 * | 9/2012 | Seo | G06F 3/04883 345/173 |
| 2014/0098188 | A1 | 4/2014 | Kwak et al. | |
| 2014/0101576 | A1 * | 4/2014 | Kwak | G06F 3/0482 715/761 |
| 2014/0101578 | A1 * | 4/2014 | Kwak | G06F 3/04883 715/761 |
| 2015/0116362 | A1 | 4/2015 | Aurongzeb et al. | |
| 2016/0198100 | A1 * | 7/2016 | Cho | H04N 5/23293 348/222.1 |
| 2019/0014248 | A1 | 1/2019 | Takao et al. | |

FOREIGN PATENT DOCUMENTS

| | | | |
|---|---|---|---|
| DE | 112017000819 | T5 | 10/2018 |
| JP | 2005-260879 | A | 9/2005 |
| JP | 2010-114568 | A | 5/2010 |
| JP | 2010-192998 | A | 9/2010 |
| JP | 2011-85699 | A | 4/2011 |
| JP | 2013-168824 | A | 8/2013 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2017/010385, dated Oct. 11, 2018, with English Translation.
International Search Report (form PCT/ISA/210) for International Application No. PCT/JP2017/010385 dated Jun. 6, 2017, with English Translation.
German Office Action dated May 23, 2019, for counterpart German Patent Application No. 112017001625.8, with English translation.

* cited by examiner

DIGITAL CAMERA AND DISPLAY METHOD OF DIGITAL CAMERA

CROSS-REFERENCE TO RELATED APPLICATIONS

The present application is a Continuation of PCT International Application No. PCT/JP2017/010385 filed on Mar. 15, 2017 claiming priority under 35 U.S.C § 119(a) to Japanese Patent Application No. 2016-071663 filed on Mar. 31, 2016. Each of the above applications is hereby expressly incorporated by reference, in their entirety, into the present application.

BACKGROUND OF THE INVENTION

1. Field of the Invention

The present invention relates to a digital camera and a display method of a digital camera, and particularly, to a technology that displays a live view image to be used in framing.

2. Description of the Related Art

In the related art, a digital camera that includes a transmissive type color liquid crystal display device and a reflective type monochrome liquid crystal display device on a rear surface of a camera main body, controls only the monochrome liquid crystal display device without driving the color liquid crystal display device in a case where a power-supply voltage is decreased or a power saving mode is set, and monochromatically displays a live view image and various setting screens (JP2005-260879A).

JP2005-260879A describes that it is determined that a screen of the reflective type monochrome liquid crystal display device using external light as a light source is not seen in a case where the outside of the digital camera is dark, luminance is further decreased than luminance in a normal power supply mode by controlling the color liquid crystal display device without driving the monochrome liquid crystal display device, and the live view image is displayed in color. In this case, power consumption is larger than that in a case where an image is displayed on the monochrome liquid crystal display device. However, it is possible to further reduce the power consumption than that in the normal power supply mode, and it is possible to view the live view image even in a dark place.

A digital camera that includes a main display panel and a front display panel respectively provided on a rear surface and a front surface of a camera main body and displays live view images on the main display panel and the front display panel is described (JP2010-114568A). The live view image is displayed on the front display panel, and thus, a person as a subject can check their pose or facial expression displayed on the front display panel.

JP2010-114568A describes that an external light amount is detected by an external light amount sensor, in a case where the external light amount is smaller than a predetermined level or it is determined that the imaging is performed against the sun, it is estimated that the person as the subject is not able to favorably view the live view image displayed on the front display panel and the display of the front display panel is controlled to be turned off.

SUMMARY OF THE INVENTION

The invention described in JP2005-260879A is the digital camera that reduces the power consumption and extends the lifespan of the power supply by controlling only the reflective type monochrome liquid crystal display device of which the power consumption is small without driving the transmissive type color liquid crystal display device of which the power consumption is large and monochromatically displaying the live view image in a case where the power-supply voltage is decreased or the power saving mode is set.

In the transmissive type color liquid crystal display device and the reflective type monochrome liquid crystal display device which are disposed on the rear surface of the camera main body described in JP2005-260879A, visibility is different depending on the external light amount. However, JP2005-260879A does not describe a problem that it is difficult to see the display screen of the transmissive type color liquid crystal display device due to the strong external light (ambient light) and does not also describe means for solving this problem.

In JP2005-260879A, in a case where the outside is dark, since the visibility of the reflective type monochrome liquid crystal display device using the external light as the light source is deteriorated, the transmissive type color liquid crystal display device a backlight is used. In this case, since the outside is also dark, the live view image is displayed with luminance lower than that at the time of the normal power supply mode, and the power consumption is reduced.

Meanwhile, JP2010-114568A describes that the external light amount is detected by the external light amount sensor, but the detected external light amount is used in order to estimate whether or not the person as the subject has brightness with which it is possible to favorably view the live view image displayed on the front display panel. That is, JP2010-114568A does not also describe the problem that it is difficult to see the transmissive type liquid crystal display device due to the strong external light.

The invention described in JP2005-260879A has a problem that it is necessary to provide the reflective type monochrome liquid crystal display device of which the power consumption is small in order to achieve the power saving mode in addition to the transmissive type color liquid crystal display device used in the normal power supply mode and the costs thereof are increased. The transmissive type color liquid crystal display device and the reflective type monochrome liquid crystal display device are disposed so as to be fixed on the rear surface of the camera main body and are not suitable for imaging in a low angle.

Similarly, the invention described in JP2010-114568A has a problem that it is necessary to provide the front display panel on the camera front surface such that the captured person can view the framing in a case where the captured person captures their photo or the live view image in addition to the main display panel disposed so as to be fixed on the rear surface of the camera main body and the costs thereof are increased. The main display panel and the front panel are respectively disposed so as to be fixed on the rear surface and the front surface of the camera main body and are not suitable for imaging in the low angle.

The present invention has been made in view of such circumstances, and an object of the present invention is to provide a digital camera and a display method of a digital camera which are capable of displaying information for supporting framing even in a situation in which it is difficult to see a live view image and are suitable for imaging in a low angle.

In order to achieve the object, an invention related to one aspect is a digital camera that displays a live view image captured by an imaging unit and camera information items including imaging conditions set by a setting unit. The digital camera comprises a first display unit that is disposed on one wall surface of a camera main body and of which a relative posture relationship with the camera main body is changeable due to rotation, a second display unit that is disposed on the camera main body independently of the rotation of the first display unit, a posture detection unit that detects a relative posture relationship between the first display unit and the second display unit, a display controller that is capable of displaying the live view image, the camera information items, or both the live view image and the camera information items on at least one of the first display unit and the second display unit, and an illuminance detection unit that directly or indirectly detects intensity of light radiated to a display screen of the first display unit. The display controller automatically changes a display form of the live view image, the camera information items, or both the live view image and the camera information items to be displayed on at least one of the first display unit and the second display unit depending on the intensity of the light radiated to the display screen of the first display unit detected by the illuminance detection unit and the relative posture relationship between the first display unit and the second display unit detected by the posture detection unit.

The relative posture relationship between the first display unit and the second display unit may be changed due to the rotation of at least the first display unit and may be the posture relationship with which both the display screens are simultaneously visible. Further, it may be difficult to see the first display unit due to the intensity of the light radiated to the display screen. Since the display form of at least one of the first display unit and the second display unit is changed, even in a case where it is difficult to see the display screen of the first display unit, it is possible to view information after the display form is changed, which is displayed on the display screen of the second display unit by merely changing a gaze direction. Since the first display unit capable of displaying the live view image is able to change the relative posture relationship with the camera main body due the rotation, even in a case where the framing in the low angle is performed, it is easy to see the live view image, and it is possible to favorably perform the framing.

A digital camera according to another aspect of the invention further comprises a determination unit that determines whether or not the display screen of the first display unit and a display screen of the second display unit are simultaneously visible based on the relative posture relationship between the first display unit and the second display unit detected by the posture detection unit. That is, the determination unit determines whether or not the display screen of the first display unit and the display screen of the second display unit are simultaneously visible depending on whether or not the display screen of the first display unit and the display screen of the second display unit is in a preset angle range (an angle range in which information items on both the display screens are able to be viewed by merely changing the gaze direction).

In a digital camera according to still another aspect of the invention, it is preferable that the display controller changes a display form on at least one of the first display unit and the second display unit based on the intensity of the light radiated to the display screen of the first display unit detected by the illuminance detection unit and a determination result of the determination unit. That is, even though the display screen of the first display unit and the display screen of the second display unit are able to be simultaneously viewed, the display forms of the first display unit and the second display unit are not changed unless it is difficult to see the display screen of the first display unit due to the intensity of the light radiated to the display screen of the first display unit.

In a digital camera according to still another aspect of the invention, it is preferable that the second display unit is disposed so as to be rotatable around the camera main body. Accordingly, it is possible to change the postures of the display screens such that the display screen of the first display unit and the display screen of the second display unit are able to be simultaneously viewed irrespective of the position and posture of the camera main body. As a result, it is possible to substantially change the display form of at least one of the first display unit and the second display unit due to only the intensity of the light radiated to the display screen of the first display unit.

In a digital camera according to still another aspect of the invention, it is preferable that the first display unit is larger than the second display unit. In a case where the live view image is mainly displayed on the first display unit and the camera information items are displayed on the second display unit, the live view image to be used in the framing can be displayed so as to be larger than the camera information items. The digital camera that includes the first display unit which is rotated around the camera main body and displays the live view image and the second display unit that is smaller than the first display unit and displays the camera information items is present as the existing digital camera. However, the digital camera according to the present invention can be achieved by slightly changing the existing digital camera such as the change of firmware, and the costs thereof are not greatly increased.

In a digital camera according to still another aspect of the invention, it is preferable that the second display unit has a display screen of which visibility under outdoor light in daytime is higher than that of the first display unit. Even in a case where the visibility of the first display unit is decreased under outdoor light in daytime (in a case where it is difficult to see the first display unit due to the bright display screen thereof), it is possible to favorably view necessary information on the second display unit.

In a digital camera according to still another aspect of the invention, it is preferable that the display controller displays at least the live view image on the first display unit and displays the camera information items on the second display unit in a case where the intensity of the light detected by the illuminance detection unit does not satisfy a set value or the relative posture relationship detected by the posture detection unit is a posture relationship with which the display screens of the first display unit and the second display unit are simultaneously invisible, and displays information for supporting framing on the second display unit in a case where the intensity of the light detected by the illuminance detection unit satisfies the set value and the relative posture relationship detected by the posture detection unit is a posture relationship with which the display screens of the first display unit and the second display unit are simultaneously visible.

That is, in general, the live view image is displayed on the first display unit and the camera information items are displayed on the second display unit. However, in a case where the intensity of the light detected by the illuminance detection unit satisfies the set value, it is difficult to see the first display unit due to the bright display screen thereof, it is difficult to perform the framing through the viewing of the live view image, and the first display unit and the second display unit have the posture relationship with which the display screens thereof are simultaneously visible, the display form of the second display unit is changed, and the information for supporting the framing is displayed on the second display unit. Thus, it is possible to perform the framing.

In a digital camera according to still another aspect of the invention, it is preferable that the display controller displays the information for supporting the framing instead of the camera information items displayed on the second display unit in a case where the intensity of the light detected by the illuminance detection unit satisfies the set value and the relative posture relationship detected by the posture detection unit is the posture relationship with which the display screens of the first display unit and the second display unit are simultaneously visible. Particularly, in a case where the screen of the second display unit is small and the camera information items and the information for supporting the framing are simultaneously displayed, it is effective in a case where it is difficult to see both the camera information items and the information for supporting the framing.

In a digital camera according to still another aspect of the invention, it is preferable that the display controller displays the information for supporting the framing in addition to the camera information items displayed on the second display unit in a case where the intensity of the light detected by the illuminance detection unit satisfies the set value and the relative posture relationship detected by the posture detection unit is the posture relationship with which the display screens of the first display unit and the second display unit are simultaneously visible. In a case where the camera information items and the information for supporting the framing are simultaneously displayed on the display screen of the second display unit, it is difficult to see both the camera information items and the information for supporting the framing, but it is effective in a case where the camera information items are desired to be checked in performing the framing.

In a digital camera according to still another aspect of the invention, it is preferable that the information for supporting the framing includes at least one of the live view image, a binary image obtained by binarizing the live view image, an index indicating a position of a main subject within the live view image, and an image obtained by enlarging the main subject within the live view image. The present invention is not limited to a case where the information for supporting the framing is displayed on the display screen of the second display unit and the case where the live view image is displayed. The binary image obtained by binarizing the live view image, the index (for example, a face frame indicating a range of a face of a person in a case where the main subject is the person or a cursor such as an arrow indicating the position of the main subject) indicating the position of the main subject within the live view image, or the image obtained by enlarging the main subject within the live view image may be displayed.

In a digital camera according to still another aspect of the invention, it is preferable that the display controller stops the display of the first display unit in a case where the intensity of the light detected by the illuminance detection unit satisfies the set value and the relative posture relationship detected by the posture detection unit is the posture relationship with which the display screens of the first display unit and the second display unit are simultaneously visible. The intensity of the light detected by the illuminance detection unit satisfies the set value, and thus, it is difficult to see the display screen of the first display unit due to the bright display screen. Accordingly, it is not inconvenient for the photographer even though the display of the first display unit is stopped, and it is possible to save power by stopping the display of the first display unit.

An invention related to still another aspect is a digital camera that displays a live view image captured by an imaging unit and camera information items including imaging conditions set by a setting unit. The digital camera comprises a first display unit that is disposed on one wall surface of a camera main body and of which a relative posture relationship with the camera main body is changeable due to rotation, a second display unit that is disposed on the camera main body independently of the rotation of the first display unit, a posture detection unit that detects a relative posture relationship between the first display unit and the second display unit, a display controller that is capable of displaying at least the live view image on the first display unit and displaying the camera information items, images representing positions of subjects within a screen, or both the camera information items and the images representing the positions of the subjects within the screen on the second display unit, and an illuminance detection unit that directly or indirectly detects intensity of light radiated to a display screen of the first display unit. The display controller automatically changes a display form of the camera information items, the images representing the positions of the subjects within the screen, or both the camera information items and the images representing the positions of the subjects within the screen to be displayed on the second display unit depending on the intensity of the light radiated to the display screen of the first display unit detected by the illuminance detection unit and the relative posture relationship between the first display unit and the second display unit detected by the posture detection unit. Here, the images representing the positions of the subjects within the screen refer to the live view image, an image obtained by trimming a part of the live view image, an image obtained by reducing the live view image, the binary image obtained by binarizing the live view image, an image obtained by increasing the contrast of the live view image, an image capable of recognizing the positions of the subjects, and schematic image information, such as a graphic image that schematically represents the positions of the subjects within the screen, an image obtained by combining graphic images that schematically represent a plurality of subject positions, an arrangement image that represents distances between the subjects and an edge of the screen, or an arrangement image that represents the displacement of the subject from the center of the screen.

In the digital camera according to still another aspect of the invention, the display controller displays at least the live view image on the first display unit and displays the camera information items on the second display unit in a case where the intensity of the light detected by the illuminance detection unit does not satisfy a set value or the relative posture relationship detected by the posture detection unit is a posture relationship with which display screens of the first display unit and the second display unit are simultaneously invisible, and displays at least the images representing the positions of the subjects within the screen on the second display unit in a case where the intensity of the light detected by the illuminance detection unit satisfies the set value and the relative posture relationship detected by the posture detection unit is a posture relationship with which the display screens of the first display unit and the second display unit are simultaneously visible.

In the digital camera according to still another aspect of the invention, the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between display of the live view image on the second display unit and display of the image other than the live view image among the two or more kinds of images on the second display unit depending on a visible level in a case where the first display unit and the second display unit have the posture relationship with which the display screens thereof are simultaneously visible.

In the digital camera according to still another aspect of the invention, the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between the two or more kinds of images on the second display unit depending on a visible level in a case where the first display unit and the second display unit have the posture relationship with which the display screens thereof are simultaneously visible.

In the digital camera according to still another aspect of the invention, the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between display of the live view image on the second display unit and display of the other image of the two or more kinds of images other than the live view image on the second display unit depending on an intensity level of the light in a case where the intensity of the light satisfies the set value.

In the digital camera according to still another aspect of the invention, the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between the two or more kinds of images on the second display unit depending on an intensity level of the light in a case where the intensity of the light satisfies the set value.

An invention related to still another aspect is a display method of a digital camera that displays a live view image captured by an imaging unit and camera information items including imaging conditions set by a setting unit. The method comprises a step of detecting a relative posture relationship between a first display unit which is disposed on one wall surface of a camera main body and of which a relative posture relationship with the camera main body is changeable due to rotation and a second display unit which is disposed on the camera main body independently of the rotation of the first display unit, a step of directly or indirectly detecting intensity of light radiated to a display screen of the first display unit, and a step of displaying the live view image, the camera information items, or both the camera information items and the live view image on at least one of the first display unit and the second display unit, a display form of the live view image, the camera information items, or both the camera information items and the live view image to be displayed on the at least one of the first display unit and the second display unit being automatically changed depending on the detected intensity of the light radiated to the display screen of the first display unit and the detected relative posture relationship between the first display unit and the second display unit.

An invention related to still another aspect is a display method of a digital camera that displays a live view image captured by an imaging unit and camera information items including imaging conditions set by a setting unit. The method comprises a step of detecting a relative posture relationship between a first display unit which is disposed on one wall surface of a camera main body and of which a relative posture relationship with the camera main body is changeable due to rotation and a second display unit which is disposed on the camera main body independently of the rotation of the first display unit, a step of directly or indirectly detecting intensity of light radiated to a display screen of the first display unit, and a step of displaying at least the live view image on the first display unit and displaying the camera information items, images representing positions of subjects within a screen, or both the live view image and the images representing the positions of the subjects within the screen on the second display unit, a display form of the camera information items, the images representing the positions of the subjects within the screen, or both the camera information items and the images representing the positions of the subjects within the screen to be displayed on the second display unit being automatically changed depending on the detected intensity of the light radiated to the display screen of the first display unit and the detected relative posture relationship between the first display unit and the second display unit.

According to the present invention, the relative posture relationship between the first display unit and the second display unit may be changed due to the rotation of at least the first display unit around the camera main body and may be the posture relationship with which both the display screens are simultaneously visible. Further, it may be difficult to see the first display unit due to the intensity of the light radiated to the display screen. In this case, since the display form of at least one of the first display unit and the second display unit is changed, even in a case where it is difficult to see the display screen of the first display unit, it is possible to view the information after the display form is changed which is displayed on the display screen of the second display unit by merely changing the gaze direction. Since the first display unit capable of displaying the live view image is able to change the relative posture relationship with the camera main body due the rotation, even in a case where the framing in the low angle is performed, it is easy to see the live view image, and it is possible to favorably perform the framing.

DESCRIPTION OF THE PREFERRED EMBODIMENTS

Hereinafter, preferred embodiments of a digital camera and a display method of a digital camera according to the present invention will be described with reference to the accompanying drawings.

<External Appearance of Digital Camera>

Figure 1:
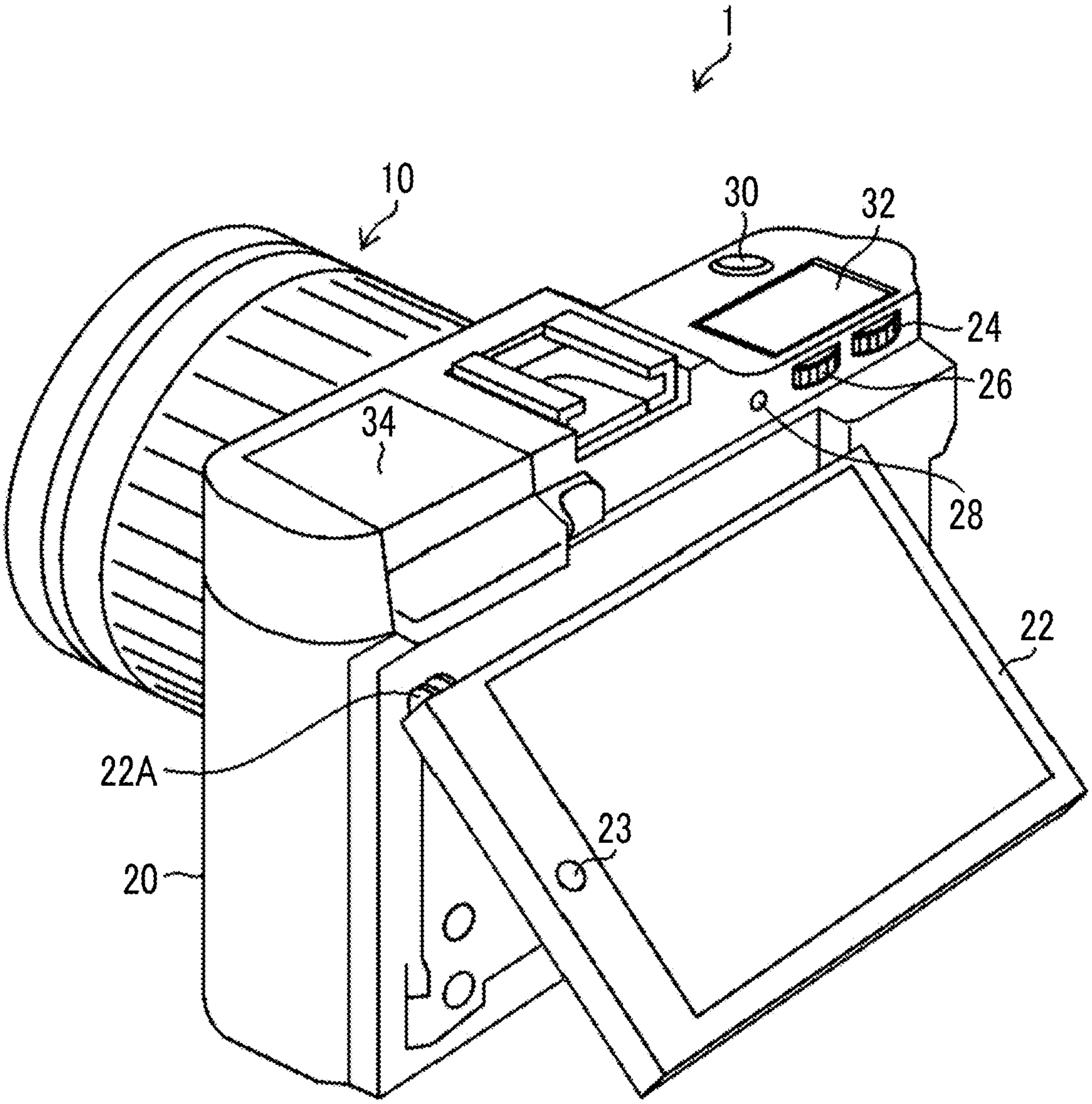
FIG. 1 is an external view showing a first embodiment of a digital camera according to the present invention, and is a perspective view in a case where the digital camera is diagonally viewed from behind.

FIG. 1 is an external view showing a first embodiment of the digital camera according to the present invention, and is a perspective view in a case where the digital camera is diagonally viewed from behind.

The digital camera 1 shown in FIG. 1 is a mirrorless digital single lens camera that includes an interchangeable lens 10 and a camera main body 20 to which the interchangeable lens 10 is detachably attached, and is not limited thereto. The digital camera may be a lens-integrated digital camera with noninterchangeable lens.

A plate-shaped first display unit 22, an exposure correction dial 24, a shutter speed dial 26, an indicator lamp 28, a playback button (not shown), multi-function cross keys including up, down, left, and right keys, and a MENU/OK button are mainly provided on a rear surface which is a wall surface of the camera main body 20.

A shutter button 30, a second display unit 32, and a pop-up flash 34 are mainly provided on an upper surface of the camera main body 20.

The first display unit 22 is a transmissive type color liquid crystal display device in the present example, and is a so-called variable-angle liquid crystal display device provided so as to be rotatable around the camera main body 20 in a range of about 180° by a hinge 22A. An illuminance sensor (illuminance detection unit) 23 that detects intensity (illuminance) of light radiated to the display screen is disposed on the same plane as that of the display screen of the first display unit 22.

The first display unit 22 functions as a display unit that displays a live view image or a live view image and camera information including an imaging condition such as a shutter speed or an F number by superimposing the camera information on the live view image at the time of an imaging mode or displays various menu screens in addition to playing an image captured at the time of a playback mode. The first display unit 22 may be used for a selfie by being rotated by about 180°.

The second display unit 32 is a reflective type monochrome liquid crystal display device, and is fixedly disposed so as to be flush with the upper surface of the camera main body 20 independently of the rotation of the first display unit 22.

Since the first display unit 22 is the transmissive type color liquid crystal display device, in a case where the intensity (illuminance) of the light radiated to the display screen is high (in a case where the intensity thereof satisfies a set value), it is difficult to see the display screen in some cases. For example, even though the intensity of a backlight of the transmissive type color liquid crystal display device is maximized, in a case where light corresponding to outdoor light in daytime is incident on the display screen, it is difficult to see the display screen of the transmissive type color liquid crystal display device.

Meanwhile, since the second display unit 32 is the reflective type monochrome liquid crystal display device, it is difficult to the see the display screen in a case where the outside is dark. However, the intensity (illuminance) of the light radiated to the display screen becomes higher, and thus, it is not difficult to see the display screen.

The first display unit 22 is larger than the second display unit 32 that displays the camera information. Since the first display unit 22 mainly displays an image, the first display unit is larger than the second display unit, and thus, it is possible to easily see the image.

The exposure correction dial 24 is a dial that corrects an exposure value EV, and sets an exposure correction value in increments of (⅓) EV in a range of −3 EV to +3 EV by rotating the dial.

In a case where a shutter speed priority automatic exposure (AE) mode is set, the shutter speed dial 26 is used to set a desired shutter speed or set programmed AE or stop priority AE depending on a rotation position of the dial.

The exposure correction value set by the exposure correction dial 24 and the shutter speed set by the shutter speed dial 26 are displayed on the second display unit 32. That is, a photographer can set the exposure correction value or the shutter speed by operating the exposure correction dial 24 or the shutter speed dial 26 while seeing a display screen of the second display unit 32.

The indicator lamp 28 notifies of a state (focus state, hand shake, or image recording state) of a camera by turning on or turning on and off green, orange, and red lamps.

The playback button is a button that switches from the imaging mode to the playback mode for displaying a captured and recorded still image or video on the first display unit 22. The MENU/OK button is an operation button that has both a function of a MENU button for instructing that a menu is displayed on the display screen of the first display unit 22 and a function of an OK button for instructing that a selected content is confirmed and executed. The cross keys are operation keys for inputting four up, down, left and right directional instructions, and function as selection keys for selecting an item from the menu screen or instructing that various setting items are selected from each menu.

<Internal Configuration of Digital Camera>

Figure 2:
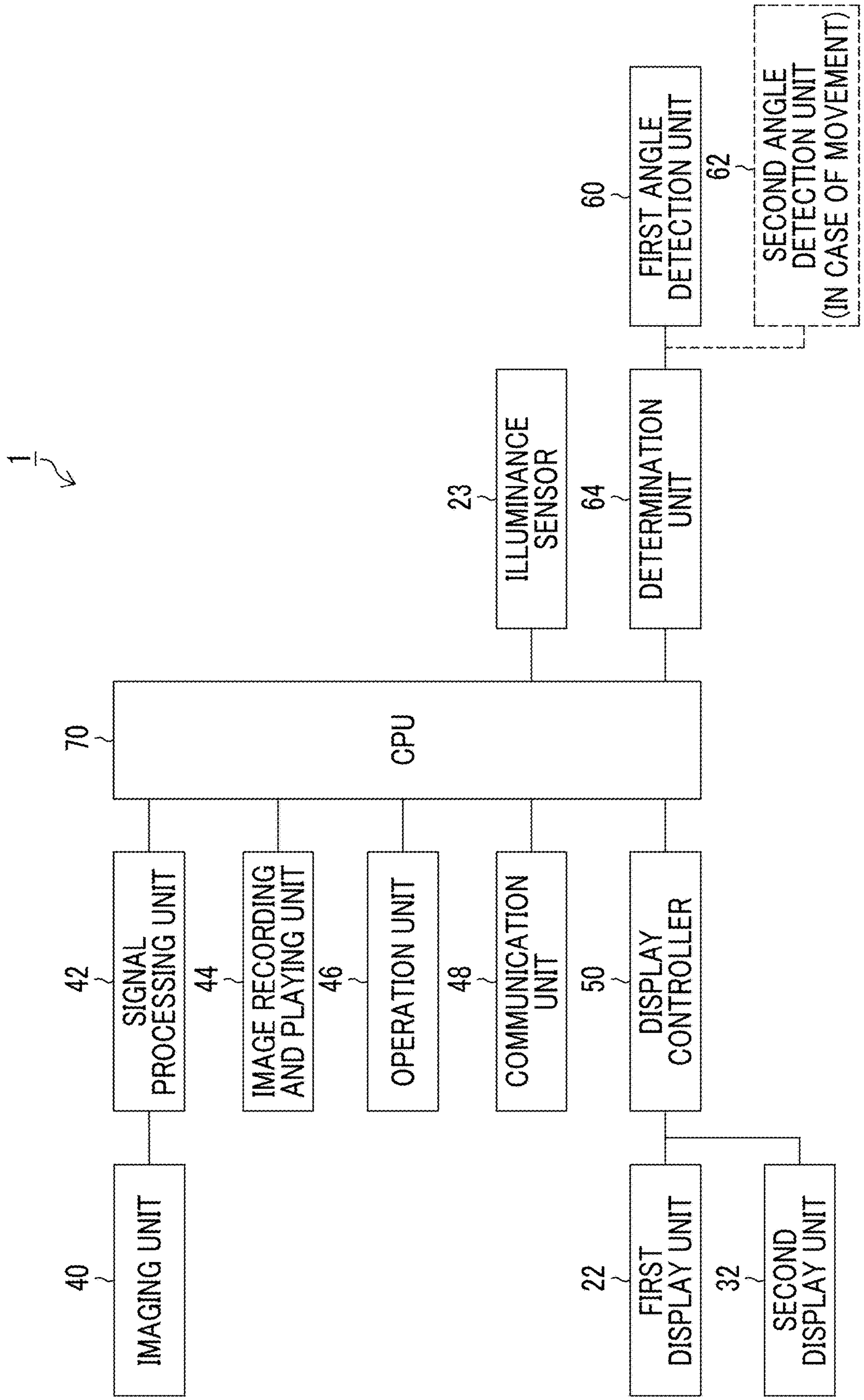
FIG. 2 is a block diagram showing an embodiment of an internal configuration of the digital camera.

FIG. 2 is a block diagram showing an embodiment of an internal configuration of the digital camera 1.

The digital camera 1 shown in FIG. 2 includes an imaging unit 40, a signal processing unit 42, an image recording and playing unit 44, an operation unit 46, a communication unit 48, a display controller 50, a first angle detection unit 60, a second angle detection unit 62, a determination unit 64, and a central processing unit (CPU) 70 in addition to the first display unit 22 having the illuminance sensor 23 and the second display unit 32.

The imaging unit 40 is an image input unit that receives image signals, and includes the interchangeable lens 10, an imaging element (not shown), and an analog front end. In a case where the imaging element is a CMOS type imaging element, the analog front end is built in the imaging element in many cases.

The imaging element is constituted by a complementary metal-oxide semiconductor (CMOS) type color image sensor. The imaging element is not limited to the CMOS type, and may be an XY address type or charge coupled device (CCD) type image sensor. The imaging element is constituted by a plurality of pixels arranged in a matrix form a predetermined pattern array (Bayer array, G stripe R/G complete checkboard, X-Trans (registered trademark) array, or honeycomb array), and each pixel includes a microlens, a red (R), green (G), or blue (B) color filter, and a photoelectric conversion section (photodiode).

An optical image of a subject formed on a light reception surface of the imaging element by an imaging optical system of the interchangeable lens 10 is converted into electrical signals by the imaging element. Processing such as color separation, gain adjustment, and analog-to-digital conversion is performed on the converted electrical signals by an analog front end within the imaging unit 40, and the processed electrical signals are output to the signal processing unit 42, as image data items (mosaic image data items) for RGB pixels.

The signal processing unit 42 performs various digital signal processing on the image data input from the imaging unit 40. The signal processing unit 42 of the present example performs digital signal processing such as offset processing, gain control processing including white balance correction and sensitivity correction, gamma-correction processing, demosaic processing (demosaicing), or RGB/YC conversion processing on the input image data items.

The image recording and playing unit 44 includes a compression/decompression processing section and a media controller. The compression/decompression processing section performs processing for compressing uncompressed image data items (Y, Cr, and Cb) obtained by converting the RGB image data items into luminance data (Y) and color difference data items (Cr and Cb) through the RGB/YC conversion processing in a predetermined compression format (for example, a still image is compressed in a Joint Photographic Experts Group (JPEG) format and a video is compressed by H264) at the time of recording the image data items and decompressing the compressed image data items recorded in a memory card into uncompressed image data items (Y, Cr, and Cb) at the time of playing the image. The media controller performs control for recording the image data items compressed by the compression/decompression processing section in the memory card at the time of recording the image, and performs control for reading out the compressed image data items from the memory card at the time of playing the image.

The operation unit 46 includes the exposure correction dial 24, the shutter speed dial 26, the shutter button 30, the playback button, the cross keys, and the MENU/OK button, and may function as a setting unit that sets the imaging condition such as the shutter speed or the F number.

The communication unit 48 is a unit that transmits the image data items stored in the memory card to a smartphone or a printer through short range wireless.

The illuminance sensor 23 provided on the first display unit 22 detects the intensity (illuminance) of the light radiated to the display screen of the first display unit 22, and outputs a detection signal indicating the detected illuminance to the CPU 70. The present invention is not limited to a case where the illuminance sensor 23 is provided on the display screen of the first display unit 22, and the illuminance sensor may be provided on a surface other than the rear surface of the camera main body 20. The camera main body 20 has an automatic exposure control function of automatically controlling the shutter speed and/or the F number, and obtains information (exposure value (EV value)) of brightness of the subject based on the imaging conditions such as brightness values of the captured image data items and the shutter speed and F number at the time of imaging in order to perform automatic exposure control. A portion that obtains this EV value may be an illuminance detection unit that indirectly detects the intensity of the light radiated to the display screen of the first display unit 22 instead of the illuminance sensor 23. In this case, the obtained EV value is used as information indicating the intensity of the light radiated to the display screen of the first display unit 22.

The first angle detection unit 60 detects an angle formed by the display screen of the first display unit 22 which is the variable-angle liquid crystal display device and the rear surface of the camera main body 20, and functions as a posture detection unit that detects a relative posture relationship with the second display unit 32 fixedly disposed on the upper surface (the upper surface perpendicular to the rear surface of the camera main body 20) of the camera main body 20.

In a case where the second display unit 32 is a variable-angle liquid crystal display device rotatable around the camera main body 20, the second angle detection unit 62 detects the angle formed by the display screen of the second display unit 32 and the upper surface of the camera main body 20. In this case, the first angle detection unit 60 and the second angle detection unit 62 function as the posture detection units that detect the relative posture relationship between the first display unit 22 and the second display unit 32.

The determination unit 64 determines whether the first display unit 22 and the second display unit 32 have a posture relationship (first posture relationship) with which the display screens thereof are simultaneously invisible or have a posture relationship (second posture relationship) with which the display screens thereof are simultaneously visible based on the angle (that is, the relative posture relationship between the first display unit 22 and the second display unit 32) detected by the first angle detection unit 60. In a case where the second display unit 32 is also the variable-angle liquid crystal display device, the determination unit determines whether the first display unit and the second display unit have the first posture relationship or the second posture relationship based on the angles detected by the first angle detection unit 60 and the second angle detection unit 62.

For example, in a case where imaging is performed in a low angle, the photographer rotates the first display unit 22 that the display screen of the first display unit 22 face upwards in order to easily see the live view image displayed on the first display unit 22.

As the rotation result of the first display unit 22, in a case where the angle detected by the first angle detection unit 60 is 90°, the display screen of the first display unit 22 and the display screen of the second display unit 32 are parallel to each other, and the photographer can simultaneously view the display screen of the first display unit 22 and the display screen of the second display unit 32.

The present invention is not limited to the case where the angle detected by the first angle detection unit 60 is 90°. The determination unit 64 determines that the first display unit 22 and the second display unit 32 have a second posture relationship with which the display screens thereof are simultaneously visible in a case where the angle is in a set angle range (90°−α to 90°−β), and determines that the first display unit 22 and the second display unit 32 have a first posture relationship with which the display screens thereof are simultaneously invisible in a case where the angle is out of the set angle range. α and β for setting the angle range may be respectively about 30°, or may be customized through user setting.

The determination result (the determination result indicating whether the first display unit 22 and the second display unit 32 have the first posture relationship with which the display screens thereof are simultaneously invisible or have the second posture relationship with which the display screens thereof are simultaneously visible) of the determination unit 64 is output to the CPU 70.

In a case where the digital camera 1 is set in the imaging mode, the display controller 50 normally displays the live view image, or the live view image and the camera information items on the first display unit 22, and displays the camera information items on the second display unit 32. The display controller automatically changes a display form of at least one of the first display unit 22 and the second display unit 32 under a predetermined condition in which the illuminance detected by the illuminance sensor 23 and the determination result of the determination unit 64. The details of the display controller 50 will be described below.

The CPU 70 generally controls the overall operation of the camera main body 20 and driving of optical members of the interchangeable lens 10, and controls the units of the camera main body 20 and the interchangeable lens 10 based on an input from the operation unit 46 including the shutter button 30, a camera control program stored in a read only memory (ROM) (not shown), and various parameters or tables to be used in image processing.

In a case where the imaging mode (still image imaging mode) is set, the CPU 70 causes the units to perform processing for displaying the live view image. That is, the CPU 70 causes the imaging of frames at a frame rate (30 fps, 60 fps) set in advance by the imaging unit 40, and causes the signal processing unit 42 to perform the signal processing on the image data items for each captured frame. The image data items continuously generated by the signal processing unit 42 are sent to the display controller 50. The display controller 50 converts the image data items for each frame which are input in order from the signal processing unit 42 into signals in a display format, and outputs the converted signals to the first display unit 22. Accordingly, the live view image indicating a subject image within an imaging range of the imaging unit 40 is displayed on the first display unit 22, and the photographer can perform framing in a case where the still image is captured while seeing the live view image displayed on the first display unit 22.

The shutter button 30 is operation means for inputting an imaging instruction, and is constituted by a so-called two-step stroke type switch including "half pushing" and "fully pushing". In the case of the still image imaging mode, the shutter button 30 is half pushed, and thus, an S1-on signal is output. Thereafter, the shutter button is fully pushed by being further pushed while being half pushed, and thus, an S2-on signal is output. The camera main body 20 performs imaging preparation such as automatic focus adjustment and automatic exposure control in a case where the S1-on signal is output, and performs the imaging and recording of the still image in a case where the S2-on signal is output.

In the case of a video imaging mode, the shutter button 30 is fully pushed, and thus, the S2-on signal is output. In this case, the camera main body 20 enters a video recording mode in which the recording of the video is started, and the image processing and recording of the video are performed. Thereafter, the shutter button 30 is fully pushed again, and thus, the S2-on signal is output. In this case, the camera main body 20 enters a standby state, and temporarily stops the recording of the video.

[Display Controller]

<First Embodiment of Display Controller>

Figure 3:
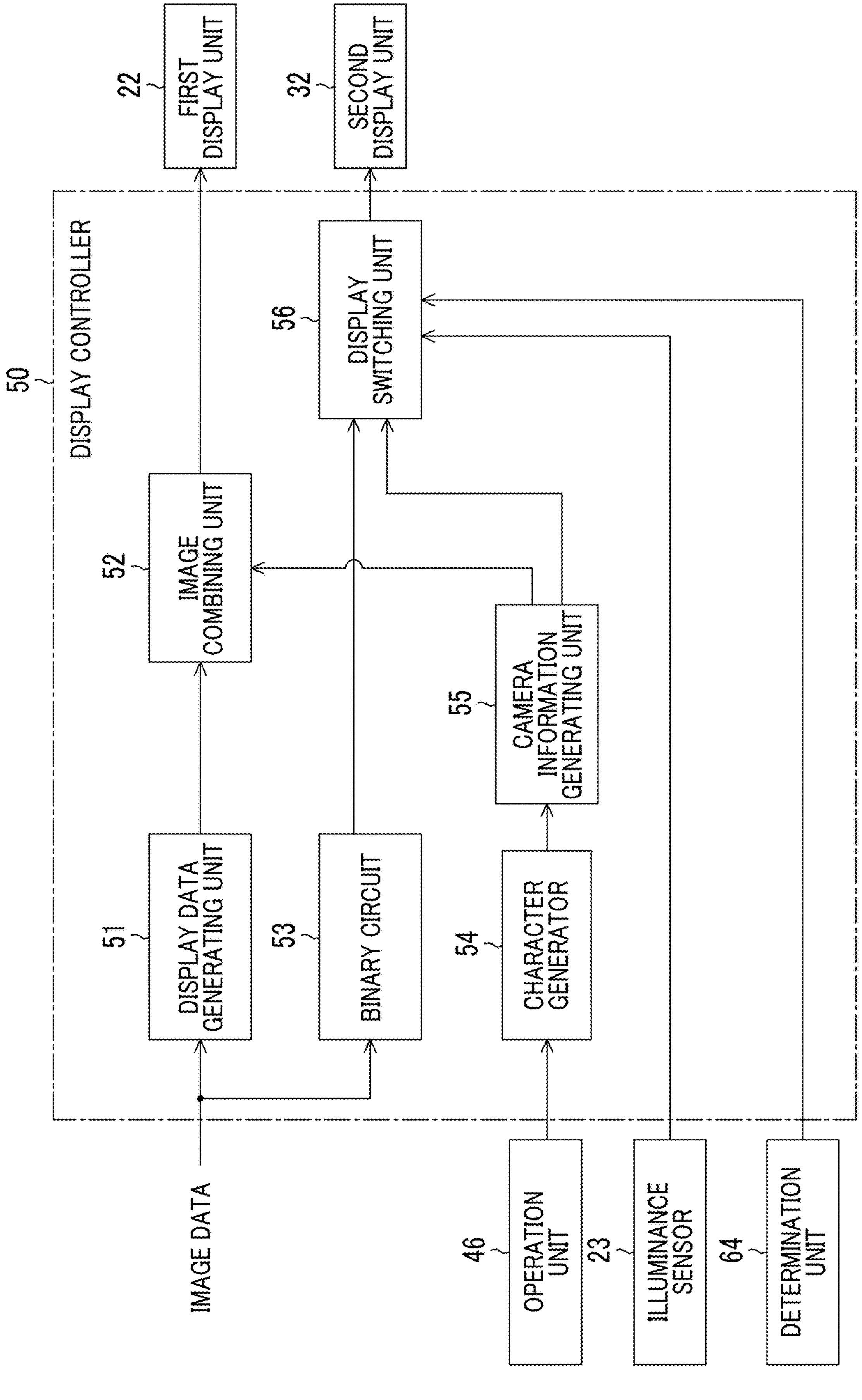
FIG. 3 is a block diagram showing a first embodiment of a display controller shown in FIG. 2.

FIG. 3 is a block diagram showing a first embodiment of the display controller 50 shown in FIG. 2.

As shown in FIG. 3, the display controller 50 mainly includes a display data generating unit 51, an image combining unit 52, a binary circuit 53, a character generator 54, a camera information generating unit 55, and a display switching unit 56.

The display controller 50 displays the live view image, the captured still image, or the image read out from the memory card on the first display unit 22. However, the operations of the respective units in a case where the live view image is displayed will be described below.

The display controller 50 automatically changes the display form of the live view image, the camera information items, or both the live view image and the camera information items to be displayed on at least one of the first display unit 22 and the second display unit 32 based on the detection signal indicating the illuminance input from the illuminance sensor 23 through the CPU 70 and the determination result input from the determination unit 64.

That is, in a case where the illuminance of the light radiated to the display screen of the first display unit 22 does not satisfy the set value (in a case where the illuminance has intensity with which the visibility of the first display unit 22 is not reduced) or it is determined that the first display unit 22 and the second display unit 32 have the first posture relationship with which the display screens thereof are simultaneously invisible through the detection signal indicating the illuminance input from the illuminance sensor 23 and the determination result input from the determination unit 64, the display controller 50 of the present example performs the display of a normal display form (first display form) so as to display at least the live view image on the first display unit 22 and display the camera information items on the second display unit 32.

Meanwhile, in a case where the illuminance of the light radiated to the display screen of the first display unit 22 satisfies the set value (has the intensity with which the visibility of the first display unit 22 is reduced) and it is determined that the first display unit 22 and the second display unit 32 have the second posture relationship with which the display screens thereof are simultaneously visible, the display controller 50 performs the display of a second display form so as to display information for supporting framing on at least the second display unit 32.

Initially, a case where the display controller 50 perform the display of the first display form which is the normal display form on the first display unit 22 and the second display unit 32 will be described.

In a case where the live view image is displayed, the display data generating unit 51 receives the RGB image data items for each frame which are captured by the imaging unit 40 and on which the signal processing is performed by the signal processing unit 42 in order, and generates display data items converted into the signals in the display format which correspond to a color dot matrix of the first display unit 22 based on the received image data items for each frame.

Figure 4:
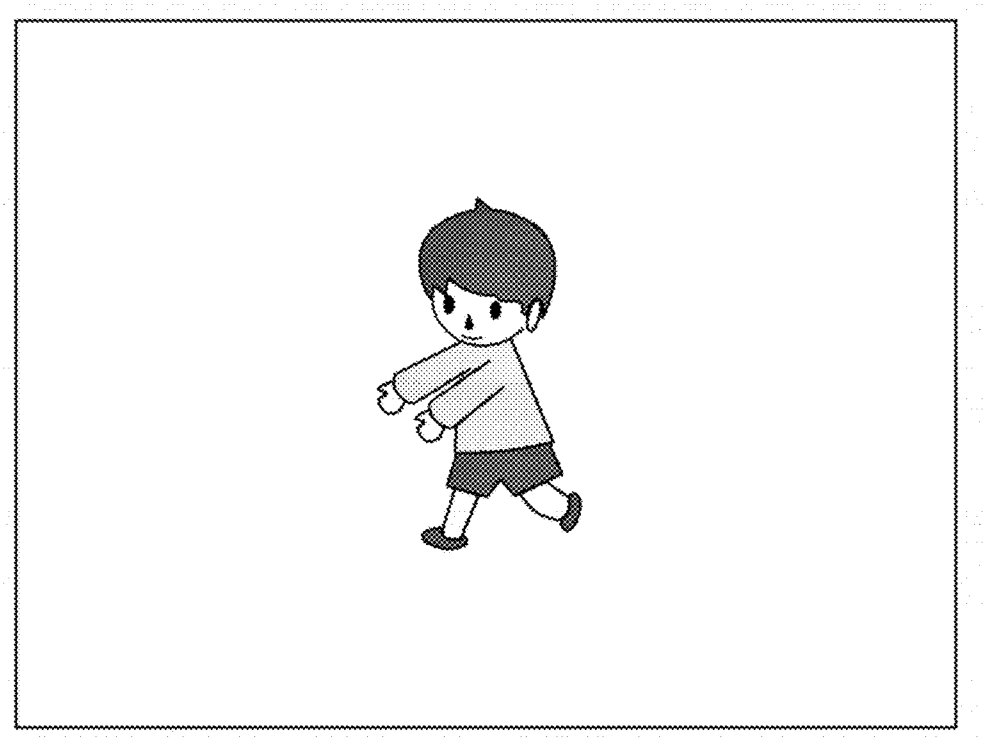
FIG. 4 shows a diagram showing a color live view image displayed on a first display unit.

The display data items generated by the display data generating unit 51 are output to the image combining unit 52. FIG. 4 shows an example of an image corresponding to the display data items generated by the display data generating unit 51.

The character generator 54 has a ROM that stores icons and fonts of characters and numbers indicating the camera information items including various imaging conditions such as the exposure correction value and the shutter speed set by the operation unit 46, reads out various icons and fonts of characters and numbers corresponding to the camera information items to be displayed on the second display unit 32 from the ROM, and outputs the readout information to the camera information generating unit 55.

The camera information generating unit 55 is a unit that generates first display data items and second display data items indicating the camera information items which are respectively displayed on the first display unit 22 and the second display unit 32. The camera information generating unit adjusts the sizes of various icons and fonts of characters and numbers corresponding to the camera information items which are input from the character generator 54 and the arrangement within the screen, and generates the first display data items and the second display data items indicating the camera information items. The first display data items and the second display data items indicating the camera information items are data items indicating monochrome binary images, respectively.

The first display data items indicating the first camera information items generated by the camera information generating unit 55 are output to the image combining unit 52, and the second display data items are output to the display switching unit 56.

Figure 5:
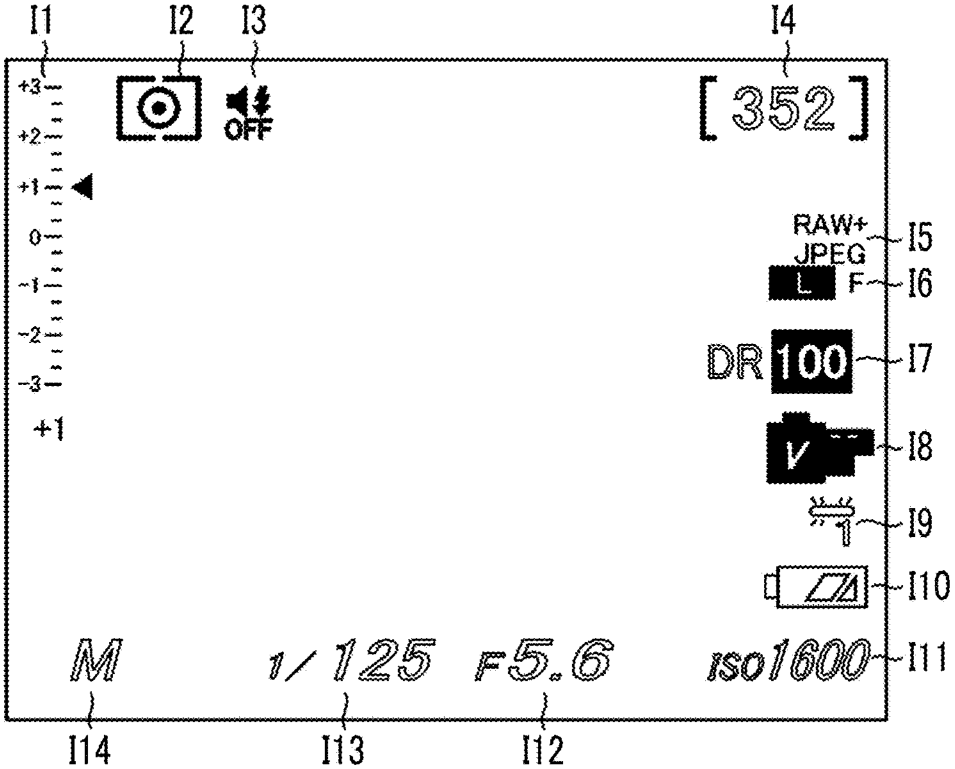
FIG. 5 is a diagram showing first monochrome camera information items displayed on the first display unit.
Figure 6:
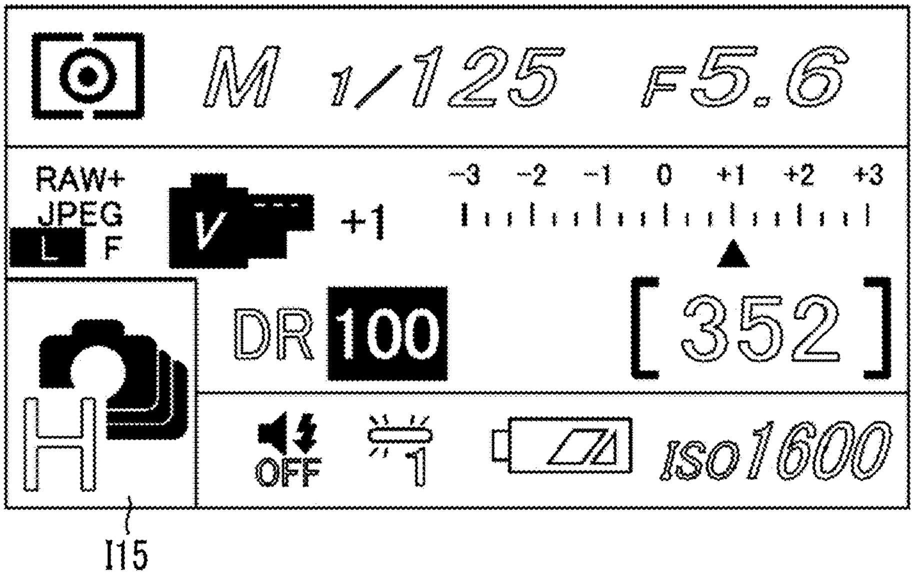
FIG. 6 is a diagram showing first monochrome camera information items displayed on a second display unit.

FIGS. 5 and 6 are diagrams showing examples of screens displayed on the first display unit 22 and the second display unit 32 based on the first display data items and the second display data items indicating the camera information items generated by the camera information generating unit 55.

As shown in FIGS. 5 and 6, the sizes of various icons and fonts of characters and numbers indicating the camera information items and the arrangement within the screen are different for the first display data items and the second display data items indicating the camera information items.

The meaning of the icons, characters, and numbers indicating various camera information items shown in FIG. 5 are as follows.

I1 . . . exposure correction bar/exposure indicator

I2 . . . icon indicating metering mode (multi metering mode)

I3 . . . icon indicating manner mode (operation sound and flash off)

I4 . . . number of images recordable in memory card (352)

I5 . . . image size (Large (L)) to be recorded/compression rate (Fine (F)) of image to be recorded I6 . . . recording of RAW image and JPEG image I7 . . . dynamic range (100%) of image to be captured I8 . . . icon indicating film simulation (Vivid (V))

I9 . . . icon indicating setting (light source: fluorescent lamp 1) of white balance I10 . . . icon indicating remaining battery capacity I11 . . . ISO sensitivity (ISO 1600)

I12 . . . F number (F5.6)

I13 . . . shutter speed (1/125)

I14 . . . imaging mode (M: Manual)

The display contents of various camera information items shown in FIG. 6 are substantially the same as the display contents of various camera information items shown in FIG. 5. However, the layout within the screen is different, and the camera information (icon I15) indicating high-speed sequential imaging (High (H)) is added.

In FIG. 3, the image combining unit 52 combines the display data items (see FIG. 4) indicating the color live view image which are input from the display data generating unit 51 with the first monochrome display data items (see FIG. 5) indicating the camera information items which are input from the camera information generating unit 55. Accordingly, display data items corresponding to an image obtained by superimposing the monochrome camera information items on the color live view image are generated.

Figure 7:
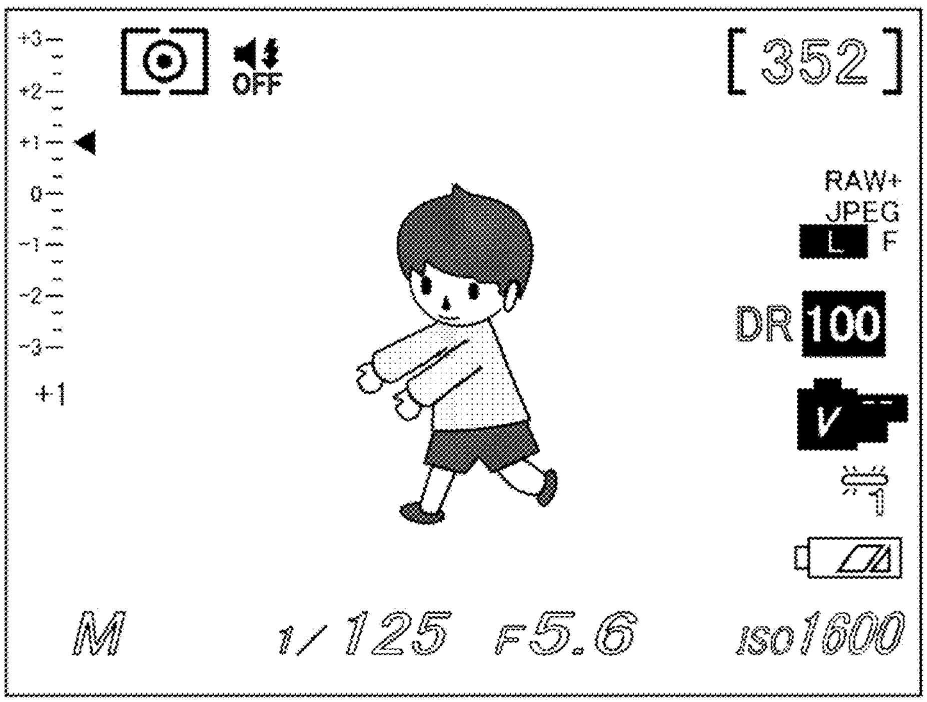
FIG. 7 is a diagram showing a color live view image on which the monochrome camera information items displayed on the first display unit are superimposed.

The display data items combined by the image combining unit 52 are output to the first display unit 22. The first display unit 22 displays the color live view image obtained by superimposing the monochrome camera information items (FIG. 5) on the color live view image (FIG. 4) based on the input display data items as shown in FIG. 7.

The photographer can ascertain the imaging range from the color live view image displayed on the first display unit 22, and can consequently perform framing for determining the imaging range. Since the monochrome camera information items are also displayed on the first display unit 22, the photographer can check the currently set imaging condition.

Meanwhile, data from the binary circuit 53 may be input to the other input of the display switching unit 56 that receives the second display data items from the camera information generating unit 55 as described below.

The display switching unit 56 selects any one data item of two input data items, and outputs the selected data to the second display unit 32. However, in a case where the illuminance of the light radiated to the display screen of the first display unit 22 has the intensity with which the visibility of the first display unit 22 is not reduced or it is determined that the first display unit 22 and the second display unit 32 have the first posture relationship with which the display screens thereof are simultaneously invisible based on the detection signal indicating the illuminance input from the illuminance sensor 23 and the determination result input from the determination unit 64, the display switching unit selects the second display data items input from the camera information generating unit 55, and outputs the selected second display data items to the second display unit 32.

In a case where the display form is the first display form, the second display unit 32 displays a monochrome image on which the icons, characters, and numbers indicating various camera information items are disposed as shown in FIG. 6 based on the second display data items input from the camera information generating unit 55 through the display switching unit 56. Accordingly, the photographer can check the currently set imaging condition by the monochrome image (camera information items) displayed on the second display unit 32.

Subsequently, a case where the display controller 50 performs the display of the second display form which is the display form under the predetermined condition on the first display unit 22 and the second display unit 32 will be described.

The predetermined condition refers to a condition in which the illuminance of the light radiated to the display screen of the first display unit 22 satisfies the set value (has the intensity with which the visibility of the first display unit 22 is reduced) and the first display unit 22 and the second display unit 32 have the second posture relationship with which the display screens thereof are simultaneously visible.

Under the predetermined condition, it is difficult to see the display screen of the first display unit 22 by the illuminance (for example, the illuminance of the outdoor light in daytime) of the light radiated to the display screen of the first display unit 22. Meanwhile, the display screen of the second display unit 32 on which the visibility is not reduced even though the illuminance is high and the display screen of the first display unit 22 have the second posture relationship with which the display screens thereof are simultaneously visible, and it is possible to view the information displayed on the display screen of the second display unit by merely changing a gaze direction.

In a case where the display form is the second display form which is the display form under the predetermined condition, information items (referred to as images representing positions of subjects within the screen) for supporting framing is displayed on the second display unit 32.

In the first embodiment of the display controller 50, the monochrome binary image is displayed on the second display unit 32, as the information for supporting the framing.

RGB image data items of each frame on which the signal processing is performed by the signal processing unit 42 are input to the binary circuit 53 in order, and the binary circuit 53 generates luminance data items from the RGB image data items, and converts binary image data items corresponding to a dot matrix of the second display unit 32. Here, the binary image data items are obtained by binarizing the generated luminance data items by a threshold value. The binary circuit 53 may directly input the luminance data items on which the RGB/YC conversion processing is performed by the signal processing unit 42.

In a case where the luminance data items have 8-bit gradations (0 to 255), a value (128) which is ½ of the 8-bit gradations may be used as the threshold value used in the binarization in the binary circuit 53. In this case, the binary circuit 53 generates the binary image data items by converting pixels for which the luminance data items have the gradations of less than 128 into 0 and converting pixels for which the luminance data items have the gradation of 128 or more into 1. The threshold value is not limited to 128. For example, an average luminance value of the luminance data items corresponding to one screen or a value appropriately set by the photographer may be used as the threshold value.

The display binary image data items generated by the binary circuit 53 are output to the display switching unit 56.

In a case where the display switching unit 56 switches the display form of the second display unit 32 from the first display form in which the camera information items are displayed to the second display form on which the information for supporting the framing is displayed, the binary image data items input from the binary circuit 53 are selected, and the selected binary image data items are output to the second display unit 32.

Figure 8:
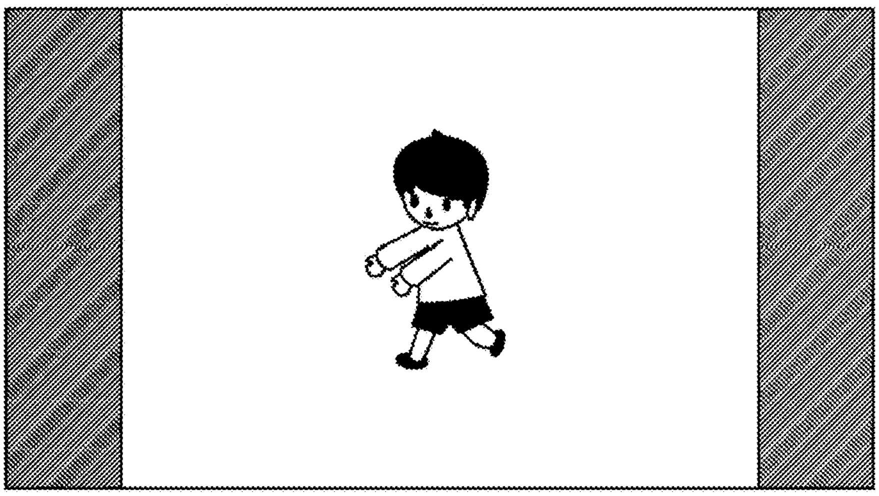
FIG. 8 is a diagram showing a live view image of a binary image displayed on the second display unit.

In a case where the display form is the second display form as stated above, the second display unit 32 displays a binary image indicating the live view image as shown in FIG. 8 based on the binary image data items input from the binary circuit 53 through the display switching unit 56.

Accordingly, in a case where it is difficult to see the live view image displayed on the first display unit 22, the photographer can view the live view image of the binary image displayed on the second display unit 32 by merely changing the gaze direction, and can perform the framing while seeing the binary image.

An aspect ratio of the display screen of the first display unit 22 of the present example is 3:4, whereas an aspect ratio of the display screen of the second display unit 32 is about 1:2. Thus, the binary circuit 53 masks both end portions of the display screen of the second display unit 32, and outputs the binary image data items adjusted such that the aspect ratio of the binary image corresponds to the aspect ratio of the display screen of the first display unit 22.

Although it has been described in the present example that the display content of the second display unit 32 is switched to the binary image indicating the live view image shown in FIG. 8 instead of the camera information items shown in FIG. 6 in a case where the display form is the second display form, the camera information items (including some of the camera information items) shown in FIG. 6 may be displayed in the masked region of the second display unit 32.

Although it has been described that the first display unit 22 of the present embodiment displays the color live view image on which the camera information items are superimposed as shown in FIG. 7, the present invention is not limited thereto. Only the live view image on which the camera information items are not superimposed may be displayed, or the color live view image on which only the specific kind of camera information items are superimposed may be displayed.

Although it has been described in the present embodiment that the first display unit 22 continuously displays the color live view image in a case where the display form is switched from the first display for to the second display form, the present invention is not limited thereto. Since it is difficult to see the display screen of the first display unit 22 due to the illuminance of the light radiated to the display screen of the first display unit 22, the display of the first display unit 22 may be stopped (the first display unit 22 may be powered off or the backlight of the first display unit 22 may be turned off) in order to achieve power saving.

<Second Embodiment>

Figure 9:
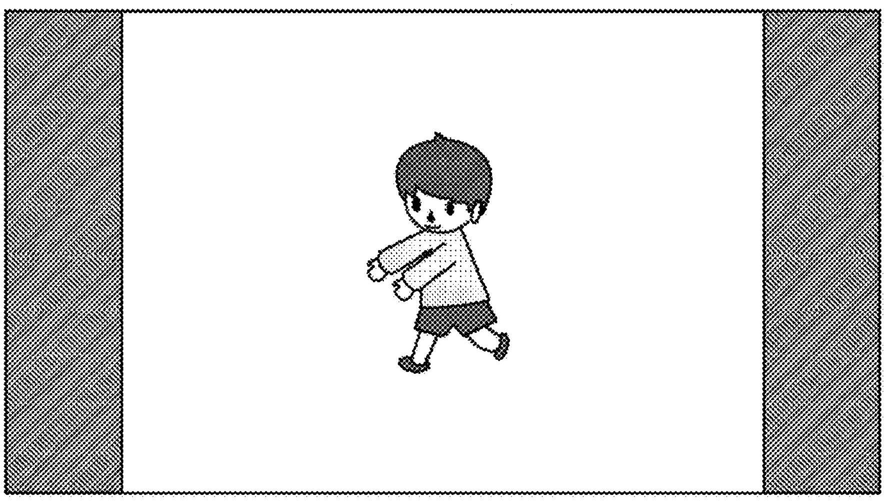
FIG. 9 is a diagram showing a grayscale live view image displayed on the second display unit.

It has been described in the first embodiment that the live view image of the binary image shown in FIG. 8 is displayed on the second display unit 32 under the predetermined condition. In a second embodiment, in a case where the second display unit 32 can display an image of multi gradations (for example, gradations of 0 to 255), the display controller 50 displays a grayscale live view image of multi-gradations on the second display unit 32 instead of the live view image of the binary image, as shown in FIG. 9.

In this case, the display controller 50 outputs the luminance data items of multi-gradations to the second display unit 32 through the display switching unit 56 without using the binary circuit 53.

As a modification example of the second embodiment, the live view image of the binary image and the grayscale live view image may be switched.

The switching between the live view image of the binary image and the grayscale live view image may be manually performed or automatically performed.

As a condition in which the grayscale live view image is automatically switched to the live view image of the binary image, a case where the contrast of a main subject is higher than the contrast of a background, a case where the movement of the main subject is high, or a case where there are clipped whites and crushed blacks within the image is considered.

<Third Embodiment>

In a third embodiment, the display controller 50 extracts the main subject from the live view image under the predetermined condition, and displays the live view image obtained by enlarging the extracted main subject on the second display unit 32. The live view image obtained by enlarging the main subject may be the binary image, or may be the grayscale image.

Figure 10:
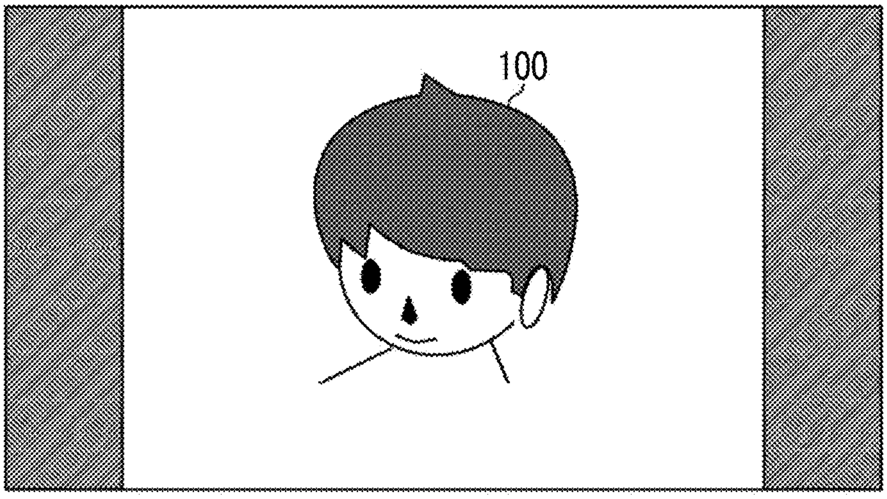
FIG. 10 is a diagram showing a live view image obtained by enlarging a main subject displayed on the second display unit.

FIG. 10 is a diagram showing an example of the display screen of the second display unit 32 that displays the live view image obtained by enlarging the main subject 100.

The photographer can easily view whether or not the main subject 100 is displayed so as to be enlarged from the display screen of the second display unit 32 as shown in FIG. 10, and can recognize that at least the main subject 100 enters the imaging range in a case where the main subject 100 is displayed so as to be enlarged within the display screen of the second display unit 32.

<Fourth Embodiment>

In a fourth embodiment, the display controller 50 detects a position of the main subject from the live view image under the predetermined condition, and displays an index indicating the position of the main subject within the live view image on the second display unit 32.

For example, in a case where a face of a person is included in the live view image, the display controller 50 determines that the face of the person is the main subject, and displays a face frame indicating the position of the face of the person as the index of the main subject.

Figure 11:
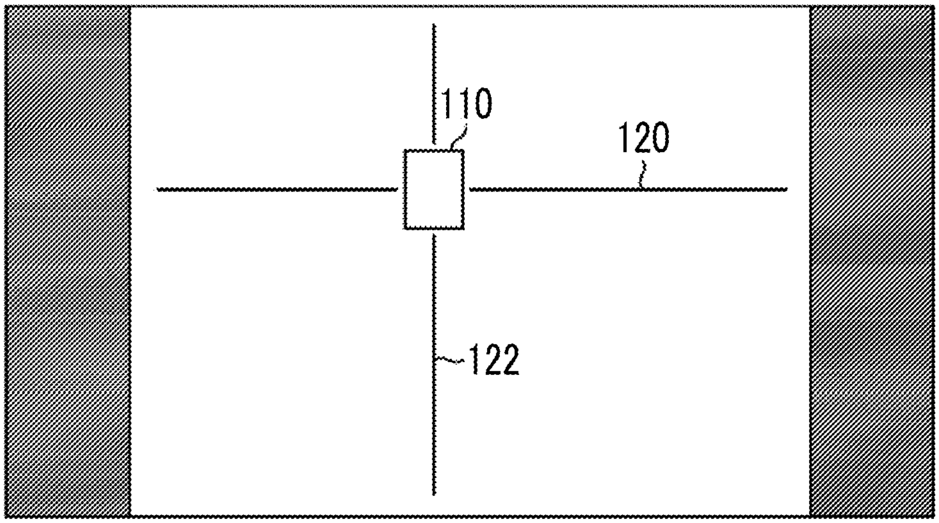
FIG. 11 is a diagram showing an example of a display screen of the second display unit that displays a face frame indicating a position of a face of a person and grids.

FIG. 11 is a diagram showing an example of the display screen of the second display unit 32 that displays a face frame 110 indicating the position of the face of the person.

In FIG. 11, 120 denotes a grid indicating a horizontal direction of the live view image, and 122 denotes a grid indicating a vertical direction of the live view image. The grids 120 and 122 are represented with the face frame 110 as a center.

The photographer can view the position (the position of the main subject) of the face frame 110 from the display screen of the second display unit 32 as shown in FIG. 11, and can perform the framing such that the main subject enters a desired position. It is possible to ascertain the inclination of the image through the grids 120 and 122.

The index indicating the position of the main subject within the live view image is not limited to the face frame 110. Various indices such as the grids 120 and 122 that cross each other at the position of the main subject and an arrow indicating the position of the main subject are considered.

<Fifth Embodiment>

In a fifth embodiment, the display controller 50 determines whether or not a group photo is captured from the live view image under the predetermined condition. Faces of persons and orientations of the faces may be detected, the faces of the plurality of persons may be detected, and whether or not the group photo is captured may be determined by whether or not the orientations of the plurality of detected faces and the intervals between the faces are substantially the same.

In a case where it is determined that the group photo is captured, the display controller 50 displays persons among the plurality of persons within the imaging range which are positioned at both ends on the second display unit 32 in a display form different that of other persons.

For example, as the method of displaying the persons among the plurality of persons within the imaging range which are positioned at both the ends in the display form different from that of the other persons, a method of displaying the persons such that the brightness of the persons at both the ends is higher than the brightness of the other persons, a method of displaying only the persons at both the ends, a method of displaying the persons at both the ends while turning on and off the persons, or a method of displaying the persons at both the ends as the binary image and displaying the other persons as the grayscale image.

Figure 12:
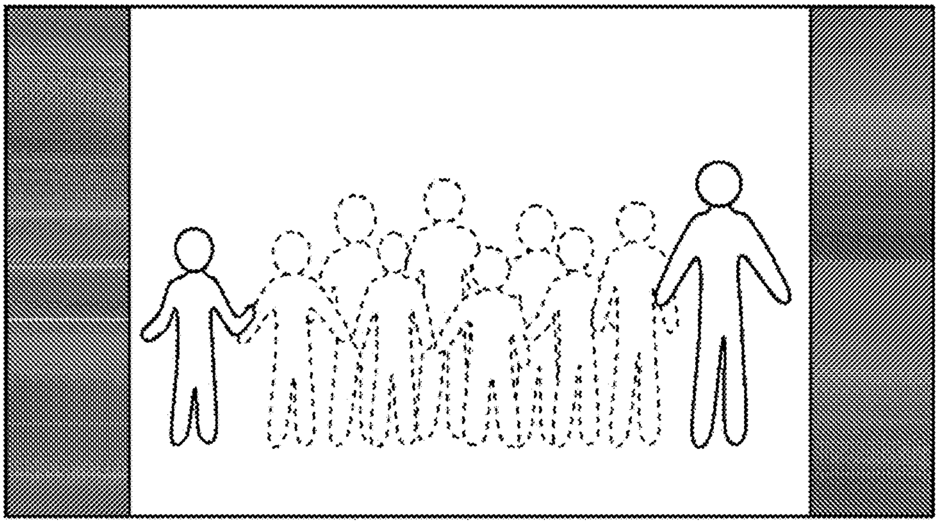
FIG. 12 is a diagram showing an example of the display screen of the second display unit that displays a plurality of persons included in a group photo.

FIG. 12 is a diagram showing an example of the display screen of the second display unit 32 that displays a plurality of persons included in the group photo.

In the example shown in FIG. 12, a case where the persons among the plurality of persons within the imaging range which are positioned at both the ends are displayed such that the brightness thereof is higher than the brightness of the other persons is shown.

The photographer can view the persons among the plurality of persons within the imaging range which are positioned at both the ends from the display screen of the second display unit 32 as shown in FIG. 12, and can consequently perform the framing of the group photo such that the plurality of persons enters the imaging range.

[Second Embodiment of Digital Camera]

Figure 13:
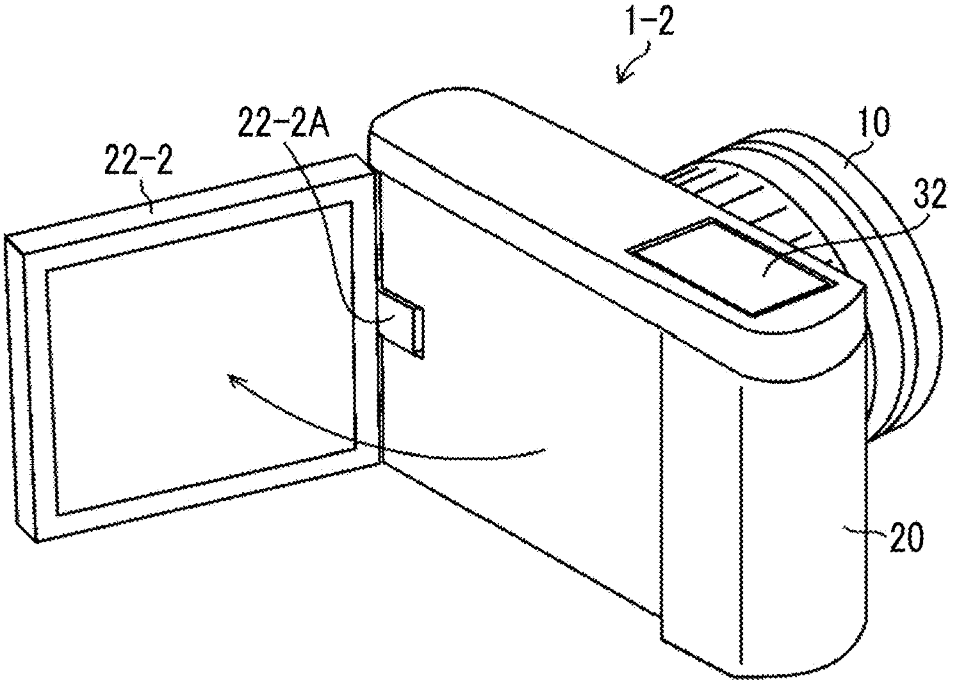
FIG. 13 is an external view showing a second embodiment of the digital camera according to the present invention, and is a perspective view in a case where the digital camera is diagonally viewed from behind.
Figure 14:
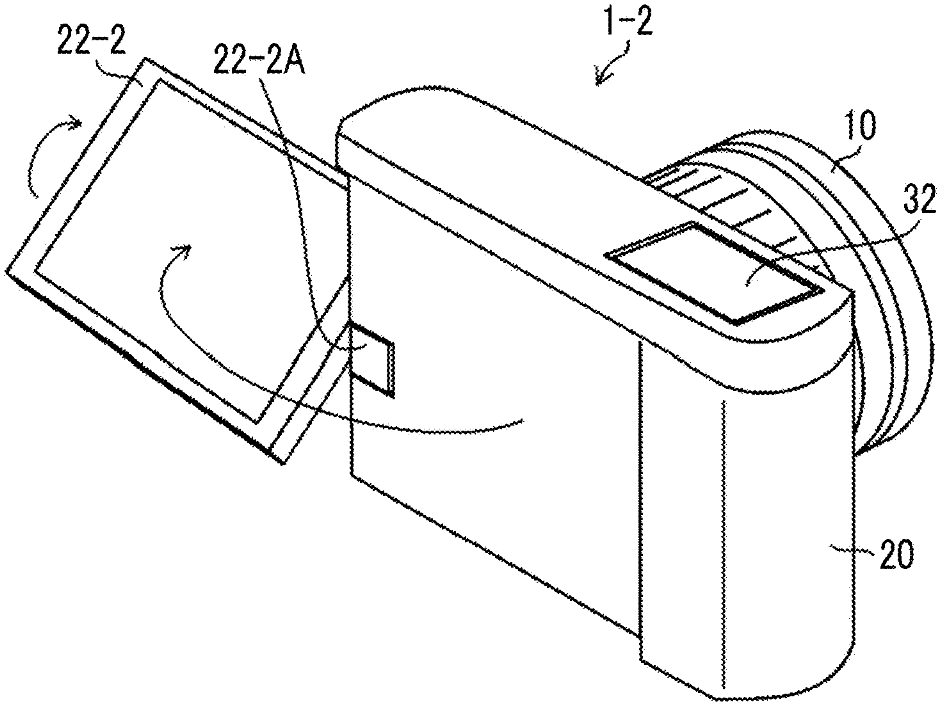
FIG. 14 is an external view showing a second embodiment of the digital camera according to the present invention, and is a diagram showing a case where a posture of the first display unit is different from a posture of the second display unit shown in FIG. 13.

FIGS. 13 and 14 are external views showing a second embodiment of the digital camera according to the present invention, and are perspective views in a case where the digital camera is diagonally viewed from behind. In FIGS. 13 and 14, portions in common with those in the digital camera 1 of the first embodiment shown in FIG. 1 will be assigned the same references, and the detailed description thereof will be omitted.

A digital camera 1-2 of the second embodiment shown in FIGS. 13 and 14 is mainly different from the digital camera 1 of the first embodiment shown in FIG. 1 in that a rotation mechanism of a first display unit 22-2 is provided.

As shown in FIG. 13, a first plate-shaped display unit 22-2 which is a transmissive type color liquid crystal display device is provided on the rear surface of the camera main body 20.

The first display unit 22-2 is a variable-angle liquid crystal display device rotatable around the camera main body 20 in an axial direction of an axis (vertical axis) of the camera main body 20 in a machine direction and an axial direction of an axis (lateral axis) thereof in a horizontal direction by an orthogonal two-axis hinge 22-2A. In a case where the first display unit is rotated by 180° in a direction (axial direction of the vertical axis of the camera main body 20) of an arrow as shown in FIG. 13, the display screen of the first display unit 22-2 can be parallel to the rear surface of the camera main body 20.

In a state in which the first display unit 22-2 is opened as shown in FIG. 14, the first display unit 22-2 can be rotated by 360° in the axial direction of the lateral axis of the hinge 22-2A, and thus, it is possible to easily see the display screen at the time of framing in low angle or high angle.

In the case of the digital camera 1-2 of the second embodiment, the relative posture relationship between the display screen of the first display unit 22-2 and the display screen of the second display unit 32 can be detected by rotation angles in the axial directions of the two orthogonal axes of the hinge 22-2A. For example, the first display unit 22-2 is rotated by 180° in the axial direction of the vertical axis of the hinge 22-2A from the state in which the first display unit 22-2 is closed. In a case where the first display unit 22-2 is rotated by 90° in the axial direction (a direction in which the display screen faces upwards) of the lateral axis of the hinge 22-2A, the display screen of the first display unit 22-2 and the display screen of the second display unit 32 are parallel to each other, and orientations (a direction of a short side of the display screen) of both the display screens are the same direction. In this case, it is possible to view the display screen of the second display unit 32 by merely moving the gaze direction from a state in which the user sees the display screen of the first display unit 22-2.

In the case of the digital camera 1-2 of the second embodiment, it is preferable that the determination unit 64 shown in FIG. 2 determines whether the first display unit 22-2 and the second display unit 32 have the first posture relationship with which the display screens thereof are simultaneously invisible or have the second posture relationship with which the display screens thereof are simultaneously visible based on detection outputs (that is, the relative posture relationship between the first display unit 22-2 and the second display unit 32) of an angle detection unit (not shown) that detects an angle of the first display unit 22-2, that is, an angle detection unit that detects an angle in the axial direction of the vertical axis the hinge 22-2A and an angle in the axial direction of the lateral axis thereof instead of the first angle detection unit 60.

[Third Embodiment of Digital Camera]

Figure 15:
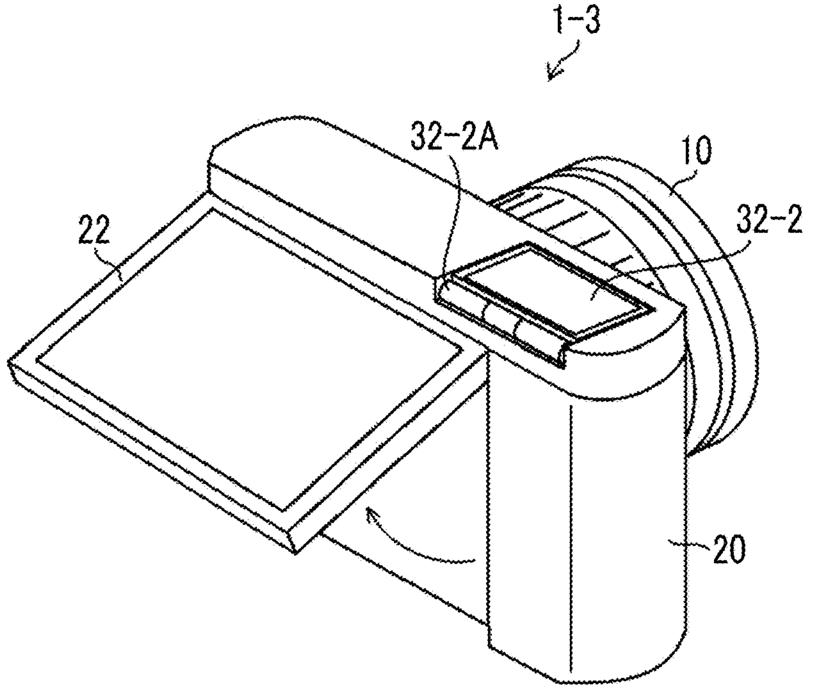
FIG. 15 is an external view showing a third embodiment of the digital camera according to the present invention, and is a perspective view in a case where the digital camera is diagonally viewed from behind.
Figure 16:
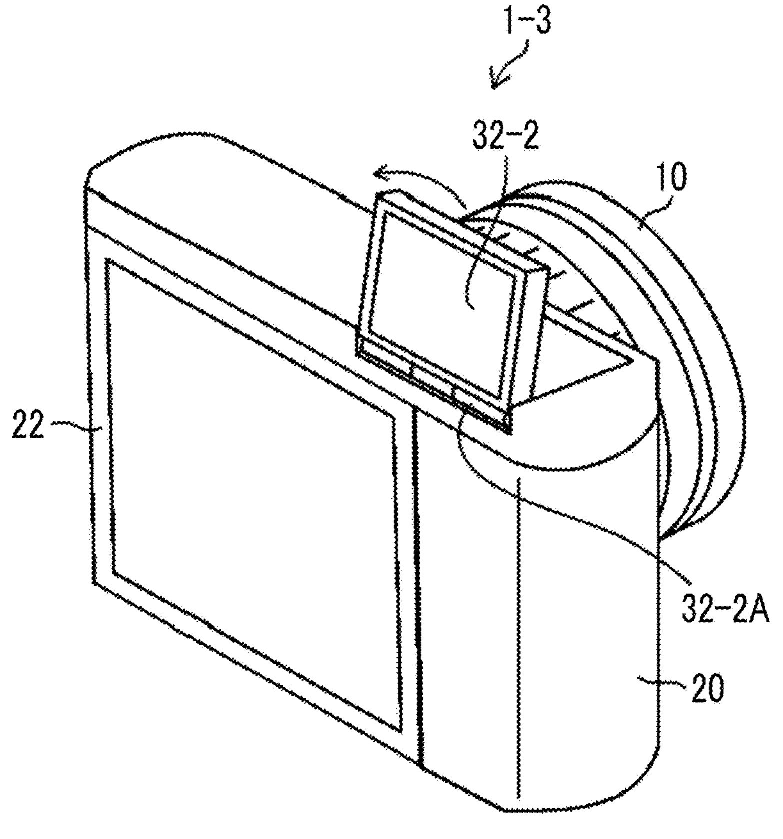
FIG. 16 is an external view showing a third embodiment of the digital camera according to the present invention, and is a diagram showing a case where the postures of the first display unit and the second display unit are different from the posture of the second display unit shown in FIG. 15.

FIGS. 15 and 16 are external views showing a third embodiment of the digital camera according to the present invention, and are perspective views in a case where the digital camera is diagonally viewed from behind. In FIGS. 15 and 16, portions in common with those in the digital camera 1 of the first embodiment shown in FIG. 1 will be assigned the same references, and the detailed description thereof will be omitted.

A digital camera 1-3 of the third embodiment shown in FIGS. 15 and 16 is mainly different from the digital camera 1 of the first embodiment shown in FIG. 1 in that a second display unit 32-2 is also provided so as to be rotatable around the camera main body 20.

As shown in FIGS. 15 and 16, the plate-shaped second display unit 32-2 which is a reflective type monochrome liquid crystal display device is provided on the upper surface of the camera main body 20.

The second display unit 32-2 is a variable-angle liquid crystal display device provided so as to be rotatable around the camera main body 20 by a hinge 32-2A.

FIG. 15 shows a state in which the display screen of the first display unit 22 is rotated in a direction (a direction of an upper surface of the camera main body 20) in which the display screen faces upwards and an angle of the display screen of the second display unit 32-2 with respect to the upper surface of the camera main body 20 is 0° (the upper surface of the camera main body 20 is flush with the display screen of the second display unit 32-2).

Meanwhile, FIG. 16 shows a state in which an angle of the display screen of the first display unit 22 with respect to the rear surface of the camera main body 20 is 0° (the rear surface of the camera main body 20 is flush with the display screen of the first display unit 22) and an angle of the second display unit 32-2 with respect to the upper surface of the camera main body 20 is about 90° (the rear surface of the camera main body 20 is substantially parallel to the display screen of the second display unit 32-2).

In a case where the relative posture relationship between the display screen of the first display unit 22 and the display screen of the second display unit 32-2 is the posture relationship shown in FIG. 15 or 16, it is possible to view the display screen of the second display unit 32-2 by merely moving the gaze direction from a state in which the user sees the display screen of the first display unit 22.

As stated above, in the case of the digital camera 1-3 of the third embodiment in which the second display unit 32-2 as well as the first display unit 22 is also rotated, it is necessary to provide the second angle detection unit 62 (the second angle detection unit 62 represented by a dotted line in FIG. 2) that detects the angle of the second display unit 32-2 as shown in FIG. 2. It is preferable that the determination unit 64 shown in FIG. 2 determines whether the first display unit 22 and the second display unit 32-2 have the first posture relationship with which the display screens thereof are simultaneously invisible or have the second posture relationship with which the display screens thereof are simultaneously visible based on the detection outputs (the relative posture relationship between the first display unit 22 and the second display unit 32-2) of the first angle detection unit 60 that detects the angle of the display screen of the first display unit 22 and the second angle detection unit 62 that detects the angle of the display screen of the second display unit 32-2.

[Display Method of Digital Camera]

Hereinafter, a display method of a digital camera according to the present invention will be described.

Figure 17:
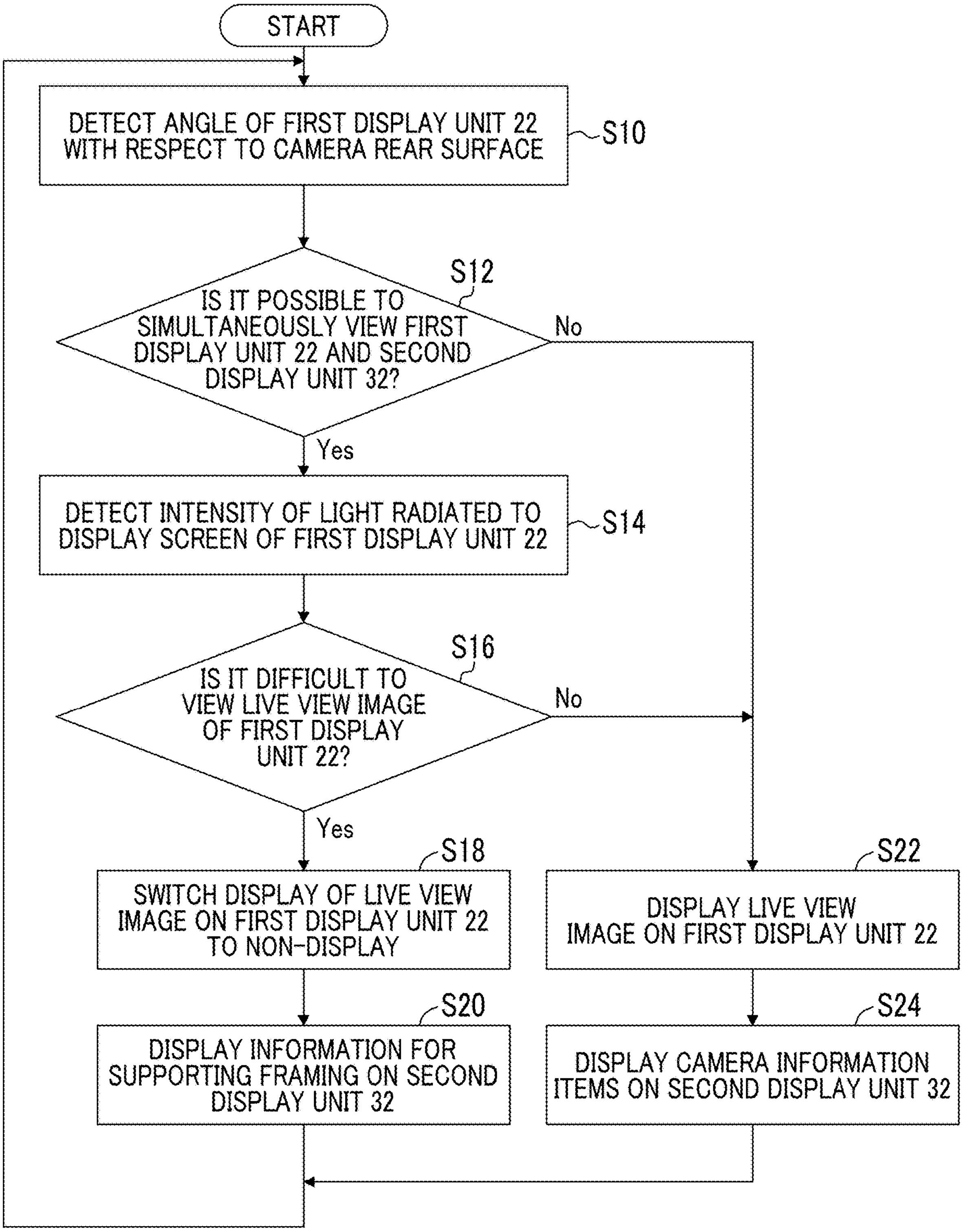
FIG. 17 is a flowchart showing an embodiment of a display method of a digital camera according to the present invention.

FIG. 17 is a flowchart showing an embodiment of the display method of a digital camera according to the present invention, and shows the display method of a digital camera 1 of the first embodiment shown in FIG. 1.

In FIG. 17, in a case where the digital camera 1 is in the imaging mode, the first angle detection unit 60 detects an angle of the display screen of the first display unit 22 with respect to the camera rear surface (step S10).

The determination unit 64 determines whether the first display unit 22 and the second display unit 32 have a posture relationship (second posture relationship) with which the display screens thereof are simultaneously visible based on the angle (that is, the relative posture relationship between the first display unit 22 and the second display unit 32) detected by the first angle detection unit 60 (step S12).

In a case where it is determined that the first and second display units have the second posture relationship through the determination result of the determination unit 64 (in the case of "Yes"), the illuminance sensor 23 detects the intensity (illuminance) of the light radiated to the display screen of the first display unit 22 (step S14).

The display controller 50 determines whether or not the illuminance of the light radiated to the display screen of the first display unit 22 satisfies the set value (that is, whether or not it is difficult to view the first display unit 22 due to the illuminance of the light radiated to the display screen of the first display unit 22) based on the detection signal indicating the illuminance input from the illuminance sensor 23 through the CPU 70 (step S16).

In a case where it is determined that it is difficult to view the live view image displayed on the first display unit 22 (in the case of "Yes"), the display controller 50 switches the display of the live view image on the first display unit 22 to non-display (the first display unit 22 is powered off or the backlight is turned off) (step S18).

Simultaneously, the display controller 50 displays the information (for example, the live view image of the binary image) for supporting the framing on the second display unit 32 (step S20).

Accordingly, even though it is difficult to see the display screen of the first display unit 22 due to the bright display screen thereof and it is difficult to perform the framing using the first display unit 22, it is possible to perform the framing of the image captured while seeing the live view image of the binary image displayed on the display screen of the second display unit 32 having the posture relationship with which the display screen thereof and the display screen of the first display unit 22 are simultaneously visible.

Meanwhile, in a case where it is determined that the display screen of the first display unit 22 and the second display unit 32 have the posture relationship (first posture relationship) with which the display screens thereof are simultaneously invisible (in the case of "No") in step S12, a case where it is determined that the illuminance of the light radiated to the display screen of the first display unit 22 does not satisfies the set value (a case where the illuminance is the illuminance with which the visibility of the first display unit 22 is not reduced (in the case of "No")) in step S16, the display controller 50 performs the display on the first display unit 22 and the second display unit 32 in the normal display form (first display form). That is, the live view image of the multi-gradations is displayed in color on the first display unit 22 (step S22), whereas the camera information items including various imaging conditions such as the exposure correction value and the shutter speed are displayed on the second display unit 32 (step S24).

For example, the processes in steps S10 to S24 are repeatedly performed for each frame, and thus, at least one of the live view image and the information for supporting the framing is displayed on at least one of the first display unit 22 and the second display unit 32.

The present invention is not limited to the case where the processes in the steps (particularly, steps S10 to S16) shown in FIG. 17 are performed according to the procedure shown in FIG. 17. For example, the processes in steps S14 and S16 may be performed before the processes in steps S19 and S12 are performed, or the processes in steps S12 and S16 may be performed after the processes in steps S10 and S14 are performed.

[Others]

Although it has been described in the present embodiment that the transmissive type color liquid crystal display device is used as the first display units 22 and 22-2, the present invention is not limited thereto. The first display unit may be another display device such as an organic electroluminescence display device or a semi-transmissive type liquid crystal display device. Although it has been described that the reflective type monochrome liquid crystal display device is used as the second display units 32 and 32-2, the present invention is not limited thereto. The second display unit may be another display device such as a reflective type color liquid crystal display device, an electronic paper, a memory liquid crystal display device, or a semi-transmissive type liquid crystal display device.

The digital camera mainly includes a digital video camera that images the video, and the live view image includes an image in a case where the video is actually captured.

The "images representing positions of subjects within the screen" refer to the live view image, an image obtained by trimming a part of the live view image, an image obtained by reducing the live view image, the binary image obtained by binarizing the live view image, an image obtained by increasing the contrast of the live view image, an image capable of recognizing the positions of the subjects, and schematic image information, such as a graphic image that schematically represents the positions of the subjects within the screen, an image obtained by combining graphic images that schematically represent a plurality of subject positions, an arrangement image that represents distances between the subjects and an edge of the screen, or an arrangement image that represents the displacement of the subject from the center of the screen. Here, two or more kinds of images including a live view image thereof may be displayed on the second display unit while being appropriately switched.

In this case, the display may be performed while switching between the display of the live view image on the second display unit and the display of the image other than the live view image among the two or more kinds of images on the second display unit, or the display may be performed while switching between the two or more kinds of images on the second display unit depending on a visible level in a case where the first display unit and the second display unit have the posture relationship with which the display screens thereof are simultaneously visible (for example, a visible level distinguished by an angle range between two screens (as the angle between the two screens becomes closer to 180°, the visible level becomes higher)).

The display may be performed while switching between the display of the live view image on the second display unit and the display of the image other than the live view image among the two or more kinds of images on the second display unit or the display may be performed while switching between the two or more kinds of images on the second display unit depending on the intensity level of the light in a case where the intensity of the light detected by the illuminance detection unit satisfies the set value. Since it is difficult to see the second display unit as the intensity level of the light becomes higher, it is preferable that an image which is easier to check the subject position is used. For example, the binary image obtained by binarizing the live view image or the image obtained by increasing the contrast of the live view image rather than the normal live view image is used as the image which is easy to check the subject position.

The present invention is not limited to the above-described embodiments, and may be modified without departing from the spirit of the present invention.

EXPLANATION OF REFERENCES

1, 1-2, 1-3: digital camera
10: interchangeable lens
20: camera main body
22, 22-2: first display unit
22A, 22-2A, 32-2A: hinge
23: illuminance sensor
24: exposure correction dial
26: shutter speed dial

28: indicator lamp
30: shutter button
32, 32-2: second display unit
34: flash
40: imaging unit
42: signal processing unit
44: image recording and playing unit
46: operation unit
48: communication unit
50: display controller
51: display data generating unit
52: image combining unit
53: binary circuit
54: character generator
55: camera information generating unit
56: display switching unit
60: first angle detection unit
62: second angle detection unit
64: determination unit
70: central processing unit (CPU)
100: main subject
110: face frame
120, 122: grid
S10 to S24 step

What is claimed is:

1. A digital camera that displays a live view image captured by an imaging unit and camera information items including imaging conditions set by a setting unit, the digital camera comprising:

a first display unit that is disposed on one wall surface of a camera main body and of which a relative posture relationship with the camera main body is changeable due to rotation;

a second display unit that is disposed on the camera main body independently of the rotation of the first display unit;

a posture detection unit that detects a relative posture relationship between the first display unit and the second display unit;

a display controller that is capable of displaying the live view image, the camera information items, or both the live view image and the camera information items on at least one of the first display unit and the second display unit; and an illuminance detection unit that directly or indirectly detects intensity of light radiated to a display screen of the first display unit, wherein the display controller automatically changes a display form of the live view image, the camera information items, or both the live view image and the camera information items to be displayed on at least one of the first display unit and the second display unit depending on the intensity of the light radiated to the display screen of the first display unit detected by the illuminance detection unit and the relative posture relationship between the first display unit and the second display unit detected by the posture detection unit.

2. The digital camera according to claim 1, further comprising:

a determination unit that determines whether or not the display screen of the first display unit and a display screen of the second display unit are simultaneously visible based on the relative posture relationship between the first display unit and the second display unit detected by the posture detection unit.

3. The digital camera according to claim 2, wherein the display controller changes a display form on at least one of the first display unit and the second display unit based on the intensity of the light radiated to the display screen of the first display unit detected by the illuminance detection unit and a determination result of the determination unit.

4. The digital camera according to claim 1, wherein the second display unit is disposed so as to be rotatable around the camera main body.

5. The digital camera according to claim 1, wherein the first display unit is larger than the second display unit.

6. The digital camera according to claim 1, wherein the second display unit has a display screen of which visibility under outdoor light in daytime is higher than that of the first display unit.

7. The digital camera according to claim 1, wherein the display controller displays at least the live view image on the first display unit and displays the camera information items on the second display unit in a case where the intensity of the light detected by the illuminance detection unit does not satisfy a set value or the relative posture relationship detected by the posture detection unit is a posture relationship with which the display screens of the first display unit and the second display unit are simultaneously invisible, and displays information for supporting framing on the second display unit in a case where the intensity of the light detected by the illuminance detection unit satisfies the set value and the relative posture relationship detected by the posture detection unit is a posture relationship with which the display screens of the first display unit and the second display unit are simultaneously visible.

8. The digital camera according to claim 7, wherein the display controller displays the information for supporting the framing instead of the camera information items displayed on the second display unit in a case where the intensity of the light detected by the illuminance detection unit satisfies the set value and the relative posture relationship detected by the posture detection unit is the posture relationship with which the display screens of the first display unit and the second display unit are simultaneously visible.

9. The digital camera according to claim 7, wherein the display controller displays the information for supporting the framing in addition to the camera information items displayed on the second display unit in a case where the intensity of the light detected by the illuminance detection unit satisfies the set value and the relative posture relationship detected by the posture detection unit is the posture relationship with which the display screens of the first display unit and the second display unit are simultaneously visible.

10. The digital camera according to claim 7, wherein the information for supporting the framing includes at least one of the live view image, a binary image obtained by binarizing the live view image, an index indicating a position of a main subject within the live view image, and an image obtained by enlarging the main subject within the live view image.

11. The digital camera according to claim 7, wherein the display controller stops the display of the first display unit in a case where the intensity of the light detected by the illuminance detection unit satisfies the set value and the relative posture relationship detected by the posture detection unit is the posture relationship with which the display screens of the first display unit and the second display unit are simultaneously visible.

12. A digital camera that displays a live view image captured by an imaging unit and camera information items including imaging conditions set by a setting unit, the digital camera comprising:

a first display unit that is disposed on one wall surface of a camera main body and of which a relative posture relationship with the camera main body is changeable due to rotation;

a second display unit that is disposed on the camera main body independently of the rotation of the first display unit;

a posture detection unit that detects a relative posture relationship between the first display unit and the second display unit;

a display controller that is capable of displaying at least the live view image on the first display unit and displaying the camera information items, images representing positions of subjects within a screen, or both the camera information items and the images representing the positions of the subjects within the screen on the second display unit; and an illuminance detection unit that directly or indirectly detects intensity of light radiated to a display screen of the first display unit, wherein the display controller automatically changes a display form of the camera information items, the images representing the positions of the subjects within the screen, or both the camera information items and the images representing the positions of the subjects within the screen to be displayed on the second display unit depending on the intensity of the light radiated to the display screen of the first display unit detected by the illuminance detection unit and the relative posture relationship between the first display unit and the second display unit detected by the posture detection unit.

13. The digital camera according to claim 12, wherein the display controller displays at least the live view image on the first display unit and displays the camera information items on the second display unit in a case where the intensity of the light detected by the illuminance detection unit does not satisfy a set value or the relative posture relationship detected by the posture detection unit is a posture relationship with which display screens of the first display unit and the second display unit are simultaneously invisible, and displays at least the images representing the positions of the subjects within the screen on the second display unit in a case where the intensity of the light detected by the illuminance detection unit satisfies the set value and the relative posture relationship detected by the posture detection unit is a posture relationship with which the display screens of the first display unit and the second display unit are simultaneously visible.

14. The digital camera according to claim 13, wherein the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between display of the live view image on the second display unit and display of the image other than the live view image among the two or more kinds of images on the second display unit depending on a visible level in a case where the first display unit and the second display unit have the posture relationship with which the display screens thereof are simultaneously visible.

15. The digital camera according to claim 13, wherein the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between the two or more kinds of images on the second display unit depending on a visible level in a case where the first display unit and the second display unit have the posture relationship with which the display screens thereof are simultaneously visible.

16. The digital camera according to claim 13, wherein the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between display of the live view image on the second display unit and display of the other image of the two or more kinds of images other than the live view image on the second display unit depending on an intensity level of the light in a case where the intensity of the light satisfies the set value.

17. The digital camera according to claim 13, wherein the images representing the positions of the subjects within the screen are two or more kinds of images including at least the live view image among the live view image, a binary image obtained by binarizing the live view image, an index indicating a position of a main subject within the live view image, or an image obtained by enlarging the main subject within the live view image, and the display controller performs switching between the two or more kinds of images on the second display unit depending on an intensity level of the light in a case where the intensity of the light satisfies the set value.

18. A display method of a digital camera that displays a live view image captured by an imaging unit and camera information items including imaging conditions set by a setting unit, the method comprising:

a step of detecting a relative posture relationship between a first display unit which is disposed on one wall surface of a camera main body and of which a relative posture relationship with the camera main body is changeable due to rotation and a second display unit which is disposed on the camera main body independently of the rotation of the first display unit;

a step of directly or indirectly detecting intensity of light radiated to a display screen of the first display unit; and a step of displaying the live view image, the camera information items, or both the camera information items and the live view image on at least one of the first display unit and the second display unit, a display form of the live view image, the camera information items, or both the camera information items and the live view image to be displayed on the at least one of the first display unit and the second display unit being automatically changed depending on the detected intensity of the light radiated to the display screen of the first display unit and the detected relative posture relationship between the first display unit and the second display unit.

19. A display method of a digital camera that displays a live view image captured by an imaging unit and camera information items including imaging conditions set by a setting unit, the method comprising:

a step of detecting a relative posture relationship between a first display unit which is disposed on one wall surface of a camera main body and of which a relative posture relationship with the camera main body is changeable due to rotation and a second display unit which is disposed on the camera main body independently of the rotation of the first display unit;

a step of directly or indirectly detecting intensity of light radiated to a display screen of the first display unit; and a step of displaying at least the live view image on the first display unit and displaying the camera information items, images representing positions of subjects within a screen, or both the live view image and the images representing the positions of the subjects within the screen on the second display unit, a display form of the camera information items, the images representing the positions of the subjects within the screen, or both the camera information items and the images representing the positions of the subjects within the screen to be displayed on the second display unit being automatically changed depending on the detected intensity of the light radiated to the display screen of the first display unit and the detected relative posture relationship between the first display unit and the second display unit.

* * * * *